United States Patent
Lainer

(10) Patent No.: US 9,239,671 B2
(45) Date of Patent: Jan. 19, 2016

(54) METHOD FOR ENLARGING A DISPLAY REGION ON A DISPLAY UNIT

(75) Inventor: Kurt Lainer, Kirchheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 1070 days.

(21) Appl. No.: 13/057,865

(22) PCT Filed: Jul. 7, 2009

(86) PCT No.: PCT/EP2009/004888
§ 371 (c)(1),
(2), (4) Date: Mar. 9, 2011

(87) PCT Pub. No.: WO2010/015303
PCT Pub. Date: Feb. 11, 2010

(65) Prior Publication Data
US 2011/0157234 A1 Jun. 30, 2011

(30) Foreign Application Priority Data

Aug. 6, 2008 (DE) .......................... 10 2008 036 600
Jan. 7, 2009 (DE) .......................... 10 2009 003 995

(51) Int. Cl.
*G06F 3/0488* (2013.01)

(52) U.S. Cl.
CPC .... *G06F 3/0488* (2013.01); *G06F 2203/04806* (2013.01)

(58) Field of Classification Search
CPC ................... G06F 2203/04806; G06F 3/0488; G06F 3/0481; G09G 2340/0414
See application file for complete search history.

(56) References Cited

U.S. PATENT DOCUMENTS

| | | | |
|---|---|---|---|
| 6,704,034 B1 | 3/2004 | Rodriguez et al. | |
| 7,389,477 B2 * | 6/2008 | Barbanson et al. | 715/791 |
| 7,966,573 B2 * | 6/2011 | Dodge et al. | 715/815 |
| 7,979,092 B2 * | 7/2011 | Shin et al. | 455/566 |
| 8,238,662 B2 * | 8/2012 | Banerjee et al. | 382/181 |
| 2005/0012723 A1 * | 1/2005 | Pallakoff | 345/173 |
| 2006/0022955 A1 | 2/2006 | Kennedy | |
| 2006/0044283 A1 | 3/2006 | Eri et al. | |
| 2007/0038955 A1 | 2/2007 | Nguyen | |
| 2007/0198950 A1 | 8/2007 | Dodge et al. | |
| 2008/0178104 A1 * | 7/2008 | Kim | 715/764 |
| 2008/0301735 A1 * | 12/2008 | Chicles | 725/47 |
| 2009/0144622 A1 * | 6/2009 | Evans et al. | 715/706 |

FOREIGN PATENT DOCUMENTS

EP 1 517 228 A2 3/2005

OTHER PUBLICATIONS

International Preliminary Report on Patentability, PCT/EP2009/004888, Apr. 21, 2011, pp. 1-7.
International Search Report, PCT/EP2009/004888, Oct. 12, 2009, pp. 50-55.

\* cited by examiner

*Primary Examiner* — Kee M Tung
*Assistant Examiner* — Frank Chen
(74) *Attorney, Agent, or Firm* — Ditthavong & Steiner, P.C.

(57) ABSTRACT

A method for enlarging display regions on displays is provided. The method includes a definition of at least two enlargeable display regions, determining a touch screen signal, associating the touchscreen signal with an enlargeable display region to be enlarged and a display region-specific enlargement of the enlargeable display region to be enlarged.

20 Claims, 18 Drawing Sheets

METHOD FOR ENLARGING A DISPLAY REGION ON A DISPLAY UNIT

CROSS-REFERENCE TO RELATED APPLICATION

The present application is a national phase application of PCT Application No. PCT/EP2009/004888, filed on Jul. 7, 2009, and claims priority to German Application No. 10 2008 036 600.5, filed on Aug. 6, 2008, and German Application No. 10 2009 003 995.3, filed on Jan. 7, 2009, the entire contents of which are herein incorporated by reference.

BACKGROUND OF THE INVENTION

1. Field of the Invention

The invention relates to a method for enlarging a display region on a display device.

2. Discussion of the Background

A method is known from specification US 2006/0022955, with which a display region of a graphic user surface on a touchscreen display can be temporary enlarged. For this purpose, a touch on the touchscreen display is detected, and a limited display region of the graphic user surface disposed around a touch zone, is enlarged. The enlargement function corresponds to a virtual magnifying glass, of which the location and movement is determined by touching the touchscreen display. The duration of the enlargement here corresponds to the time during which the touchscreen is touched plus a delay time. The enlargement function leads either to an enlargement of a display region without regard to the relevance of displayed objects or information units, or to an enlargement of an object.

However, an object-specific or information-unit-specific enlargement which depends upon the relevance and/or the content of an object, such as a dialog box or an information unit, is not possible. A further enlargement of an object disposed within the enlarged region, for example, a menu point within the dialog box or an information unit of an already enlarged object or an already enlarged information unit is also not disclosed. Accordingly, it is not possible to adapt the enlargement to given application-specific criteria.

SUMMARY OF THE INVENTION

Embodiments of the invention therefore provide a method for enlarging display regions on displays, with which a display region can be enlarged in a manner which is adapted to given application-specific criteria or compulsory conditions especially in order to facilitate the operation of test instruments in this manner.

The method according to embodiments of the invention for the enlargement of a display region on a display device provides a definition of at least two enlargeable display regions. Accordingly, different enlargeable display regions can each be enlarged individually and at the request of a user. For this purpose, a touchscreen signal is determined from a touch on the display device. Accordingly, the request of a user to enlarge a given enlargeable display region selected by the touch, can be determined. The touchscreen signal is allocated to an enlargeable display region to be enlarged, which is enlarged in a display-region-specific manner, that is to say, in an individual manner. For this allocation, a sensitive region is allocated to the touchscreen signal, which is allocated to the given the enlargeable display region as a region to be enlarged. A touch on the sensitive region leads to an enlargement of the given enlargeable display region. The sensitive region in this case can be the same size, larger or smaller than the region to be enlarged. In particular, the sensitive region can be of the same or a different shape from the region to be enlarged. Accordingly, a particularly simple operation is possible, because, for example, small enlargeable regions can provide relatively larger sensitive regions. This facilitates "aiming". The enlargeable display region is enlarged in an individual manner, that is to say, with an enlargement function specific for this display region. The different display regions to be enlarged are therefore each enlargeable in a different manner as required. Accordingly, the type of enlargement can be adapted to given application-specific criteria or compulsory conditions. For example, the change of the size and/or the shape and/or the position and/or the content of the display region to be enlarged can be matched to the display region to be enlarged and/or to the display region subsequently displayed in an enlarged manner. In this manner, a high level of user friendliness can be achieved in display and operation. An enlargeable display region is optionally but not compulsorily a limited region of the screen display separated from the remaining display region in a visually recognizable manner.

In one preferred embodiment, a partial region of an enlargeable and/or enlarged display region is defined or specified as an enlarged and/or further enlargeable display region or partial region. In this manner, a superordinate enlargeable and/or enlarged display region can provide a subordinate enlarged and/or enlargeable display region contained within it as an enlarged and/or enlargeable and/or further enlargeable display region. In exactly the same manner, a superordinate enlargeable and/or enlarged display region can provide a group of subordinate enlargeable and/or enlarged display regions, in each case as enlargeable and/or further enlargeable display regions. The group of subordinate enlargeable display regions can also be enlarged or further enlarged as an independent enlargeable and/or enlarged display region. An enlarged and/or enlargeable display region can be a subordinate and/or a superordinate enlargeable and/or enlarged display region; that is to say, it can provide an enlargeable and/or enlarged display region or a group of enlargeable and/or enlarged display regions and can also itself be contained within an enlarged and/or enlargeable display region or in a group of enlarged and/or enlargeable display regions. With a nesting of this kind, a subordinate display region can also be directly enlarged without a superordinate display region, in which the subordinate display region is contained, needing to be enlarged. Similarly, it is also possible, that a subordinate display region is only defined as a further enlargeable display region in an enlarged display of an enlargeable display region.

In one exemplary embodiment, a display region enlargeable again within a display region presented in an enlarged manner is defined as a further enlargeable partial region of an enlarged display region. Accordingly, it is possible further to enlarge a further enlargeable partial region of an already enlarged display region. As a result of the successive and selective enlargement made possible in this manner, relevant regions can be selected for an enlargement. Accordingly, an enlargement of unimportant display regions and/or partial regions can be avoided. A nested display with correspondingly small operating elements therefore does not have a negative influence on operation, because a stepwise enlargement displays the required regions in a user-friendly manner.

By preference, the type of enlargement, that is to say, the mapping or enlargement function, is specified through several independent parameters. The enlargement function is specified in a variable manner and, in particular, in a displayregion-specific manner. The parameters specifying the enlargement function can be selected in such a manner that the enlargement leads to a complete, favorably positioned, easily legible and easily operated enlarged display of the enlargeable display region to be enlarged on a display. For this purpose, geometric factors such as height and width can each be individually enlarged, released or held constant. Font, font size, character spacing and line spacing can also be varied independently of one another and independently of the geometric factors. The position (for example, centre point, or focal point or lower left-hand corner etc.) of the enlarged display of the enlargeable display region can also differ from the position of the enlargeable display region to be enlarged. By preference, the enlargement is selected in such a manner that the content of the enlargeable display region (graphic/s, information, operating elements) is reproduced in its entirety. Accordingly, the position and the enlargement factors in the x and y direction (width, height) can depend in each case upon a consideration of properties of the display region to be enlarged. Such properties are, for example, position and/or shape and/or size and/or content.

In the enlargement of a region, it can occur that the entire display region to be enlarged cannot be displayed in the enlarged display. In this case, it is also possible to introduce automatically so-called scroll bars, with which the displayed detail can then be altered in the enlarged display. In specifying the position, it is also possible to select the region around the touch point.

In one exemplary embodiment, the type of enlargement is specified dependent upon the size and/or shape and/or position of the enlargeable display region to be enlarged. Accordingly, the size and/or shape and/or position of the enlargeable display region to be enlarged is taken into account, in order to specify which size and/or shape and/or position the enlarged display of the enlargeable display region should provide.

In one preferred exemplary embodiment, the type of enlargement is specified dependent upon the content of the enlargeable display region. That is to say, the size and/or shape and/or position of the enlarged display region can be selected in such a manner that additional information about the content is displayed and/or the legibility and/or operation of a special content is simplified as a result.

By preference, the display region to be displayed in an enlarged manner contains as its content a virtual operating element and/or an information unit. The legibility and/or operability of the touchscreen display is therefore increased. In this manner, several virtual operating elements and/or information unit can be displayed by the display region to be displayed in an enlarged manner.

All of the exemplary embodiments and explanations relate in general to one display region. It is evident that these possibilities exist independently of the respective hierarchy level of the display regions to be enlarged, that is to say, independently of whether the respective display region is superordinate or subordinate.

BRIEF DESCRIPTION OF THE DRAWINGS

One preferred exemplary embodiment of the method according to the invention is illustrated in the drawings and will be explained in detail in the description below. The drawings are as follows.

Components having the same reference numerals denote same components. It is thus dispensed with a repeated description in all of the figures.

DETAILED DESCRIPTION OF EXEMPLARY EMBODIMENTS OF THE INVENTION

Figure 1:
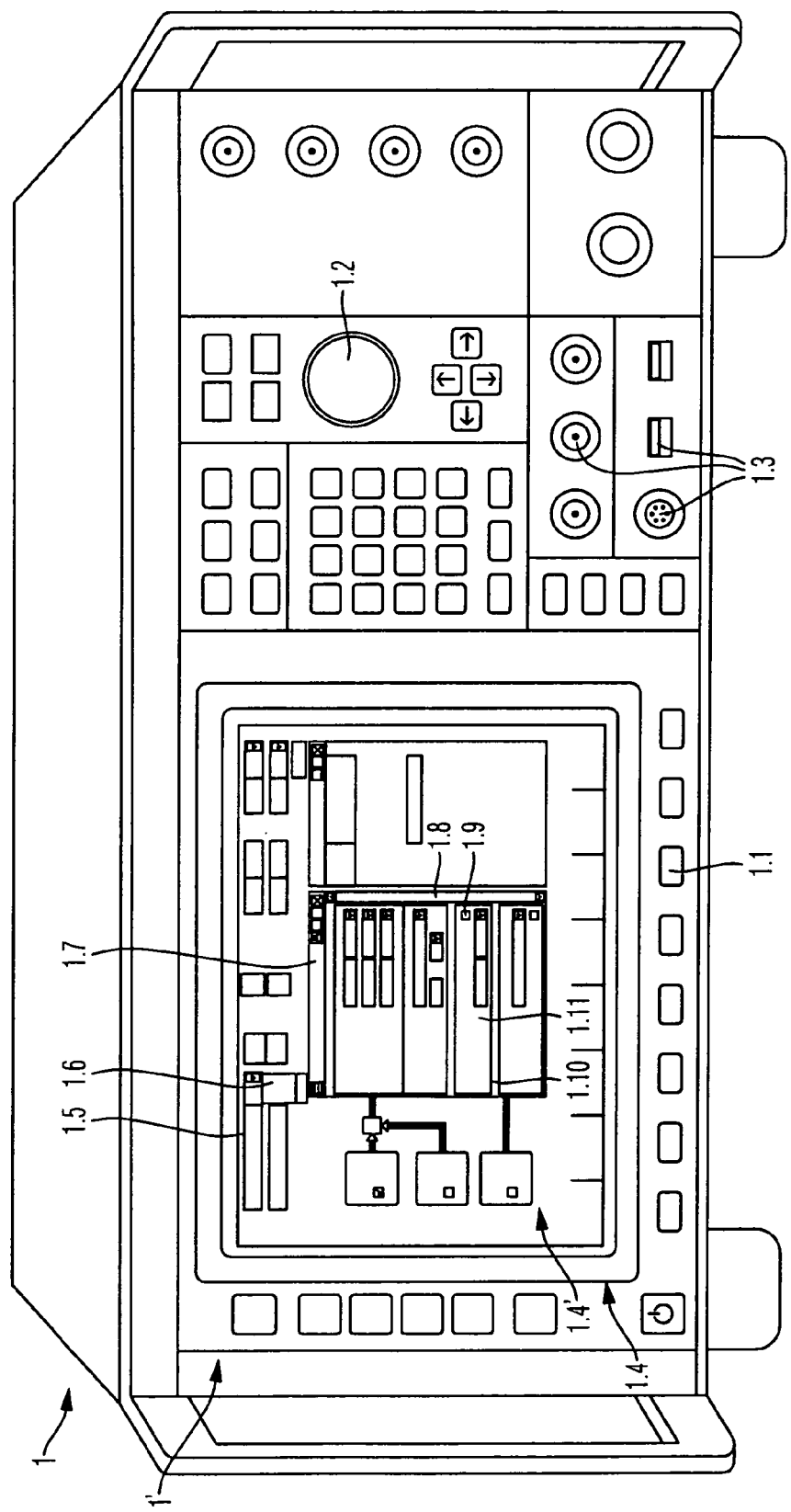
FIG. 1 shows an example of a measuring instrument with an exemplary screen display with enlargeable display regions.

FIG. 1 shows by way of example a measuring device 1 with a front panel 1' with keys 1.1 and a rotary knob 1.2 as operating elements, connections 1.3 of various types, such as electrical or optical connections from the prior art, as connections for signal inputs and outputs, and a display device 1.4 with a screen display 1.4' with several display regions, on which the method according to the invention can be used. In the illustrated exemplary embodiment, the front panel 1.4' comprises enlargeable numerical values 1.5, an enlargeable pull-down menu 1.6, an enlargeable window control element 1.7, an enlargeable scroll bar 1.8, an enlargeable click box 1.9, an enlargeable display region 1.10 with at least one further enlargeable partial region 1.11 as enlargeable display regions. The illustrated display regions represent operating elements. Individual display regions 1.5-1.11 can be selected and enlarged by a touch on the display device 1.4 designed as a touchscreen. A sensitive region is associated with each of the individual display regions 1.5 to 1.11. The respective sensitive regions can be selected by a touch on the screen. The enlargement or the function of the display region can be activated in this manner. Individual operating elements can also be operated via the operation of the keys 1.1 and/or the rotary knob 1.2 on the front panel 1.4 instead of by touching the touch screen. For this purpose, individual display regions and physical operating elements of variable function, for example, 1.1, 1.2, are associated with one another. By preference, an operation via keys does not lead to an enlargement, while an operation via the screen does lead to an enlargement. An operation can also be implemented via external devices such as a keyboard and mouse. Cursor keys, rotary knobs, softkeys, hardkeys etc. can be used.

The method according to the invention for enlarging display regions on display devices 1.4, referred to below by way of abbreviation as displays, relates to enlargeable display regions. An enlargeable display region is demarcated from the remainder of the display by a preferably visually displayed boundary. For example, borders, color changes or similar are suitable as the boundary. Respectively associated contents and/or virtual operating elements are displayed within such boundaries. A boundary embodied in such a concretely visible manner can also be dispensed with. This is advantageous, for example, if a visual demarcation is superfluous as a result of a logical classification. Sub-regions of enlargeable and/or already enlarged display regions can for their part also be enlargeable and can therefore also be defined as enlargeable display regions. Already enlarged display regions can for their part also be further enlargeable. A group of enlargeable display regions or sub-regions can also be defined as independently enlargeable display regions and can be enlarged as such. An enlargeable display region can represent a fixed content or, especially in the case of virtual operating elements, a variable content. A content can be, for example, a virtual operating element and/or an information unit. A virtual operating element can be, for example, a button, a click box or an entry field. A touchscreen signal is determined in a spatially resolved manner on the basis of a touch on a touch-sensitive display and allocated in a known manner (for example, by means of a sensitive region) to an enlargeable display region, which is accordingly determined as a display region to be enlarged. The enlargeable display region to be enlarged is enlarged in a display-region-specific manner, that is to say, the type of enlargement to be implemented for it, for example, with regard to its enlargement factors in the x and y direction and the position of the enlarged display, is specified in an individual manner for this given enlargeable display region to be enlarged.

The type of display-region-specific enlargement, that is, the display-region-specific mapping and/or enlargement function is preferably specified by several independent parameters. For example, the type of enlargement can be specified dependent upon the size and/or shape and/or orientation and/or position and/or content of the enlargeable display region to be enlarged. The size and/or shape and/or orientation and/or position and/or content of the enlarged display region can therefore be specified dependent upon the size and/or shape and/or orientation and/or position and/or content of the enlargeable display region to be enlarged. In this manner, an adequate enlargement, that is, an enlargement adapted to the operation to be implemented which guarantees a particularly good legibility and/or operability of the enlarged display region and the contents contained therein because of the shape and/or positioning and/or orientation of the enlarged display region, is possible. Moreover, the enlargement can also be selected in such a manner that important, non-enlarged contents are not concealed. In a case of this kind, the enlargement is a compromise. An enlarged display region and also a part of such a display region can be defined in each case as enlargeable regions. In this manner, an already-enlarged display region can be further enlarged in a display-region-specific manner as an enlargeable display region, wherein the type of enlargement for the further enlargement can also be specified in an individual manner. In order to specify the type of enlargement, a set of parameters which contains at least the position and enlargement factor in x and y direction can, for example, be specified in a table for each display region defined as enlargeable.

Figure 2:
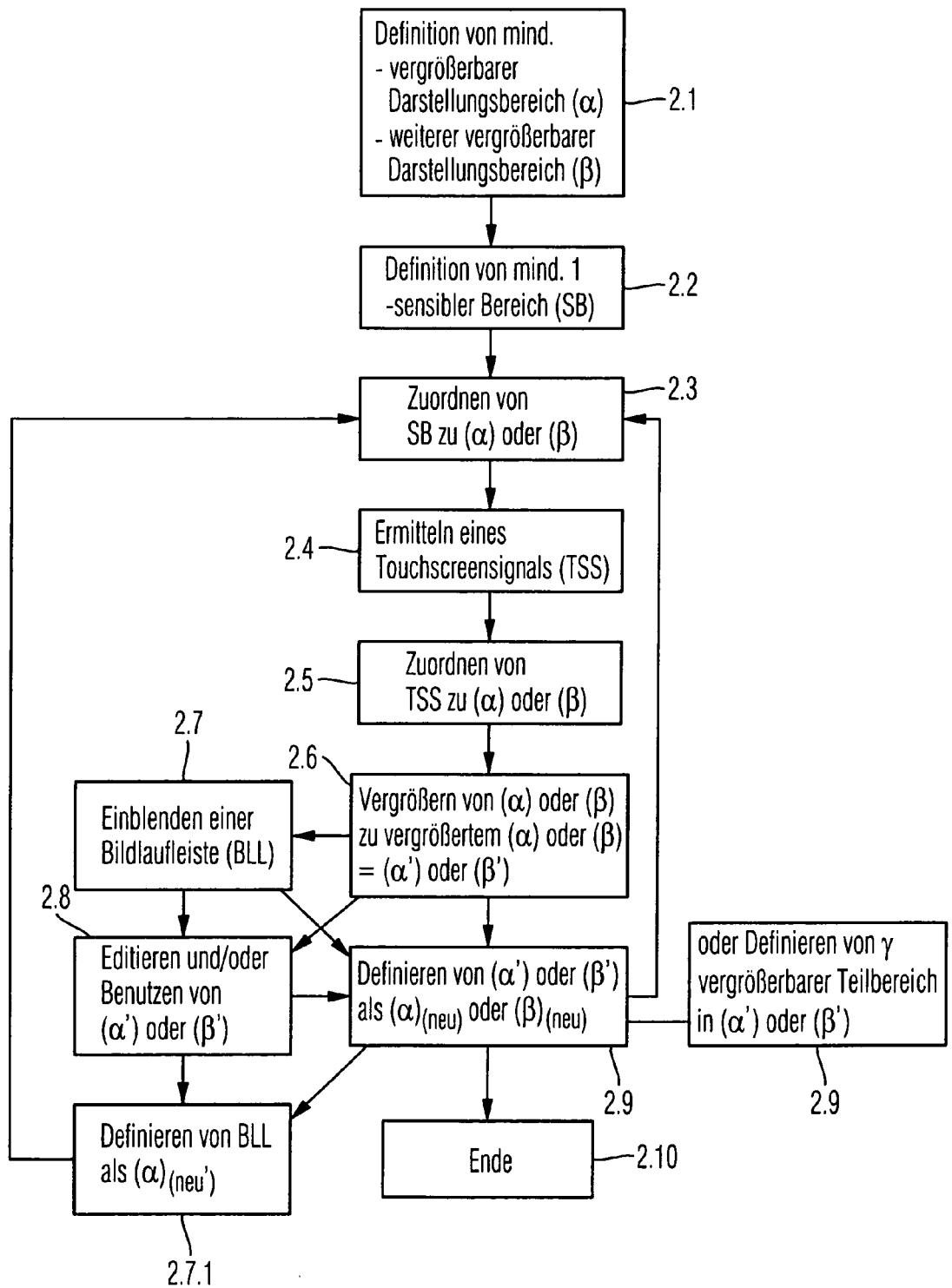
FIG. 2 shows a flow chart for several exemplary embodiments of the method according to the invention.

An exemplary embodiment of the course of the method according to the invention is shown in FIG. 2. In this context, it should be noted that all of the method steps need not always be implemented. In a first method step 2.1, at least two different enlargeable display regions are defined ($\alpha$, $\beta$). Accordingly, an enlargeable display region ($\alpha$) can also be defined as an enlargeable sub-region of a further enlargeable display region ($\beta$), that is to say, can be disposed within the second, enlargeable display region ($\beta$). In a second method step 2.2, at least one sensitive region (SB) is defined. In a third method step 2.3, the size and/or shape and/or orientation and/or position of the sensitive region (SB) is adapted to the enlargeable display region ($\alpha$, $\beta$) with which the sensitive region (SB) is associated.

In the event of any touch on the touchscreen and the evaluation of such a touch, an accidental triggering of a function, which is associated with an active region can be prevented in a non-enlarged condition of the display region. For this purpose, it is possible to block the realisable functions, for example, of click boxes or control buttons, so long as the display region is not enlarged. This can also be implemented selectively only in the case of a use of the touchscreen, so that an operation, for example, with pointing device (mouse) can be also implemented without enlargement.

The boundaries of the sensitive region and of the enlargeable display region can also differ from one another spatially. This is advantageous, if the display region to be enlarged is comparatively small. Accordingly, through a difference between the geometry of the sensitive region and the enlargeable display region, it is possible to facilitate "aiming" with a touch on the touchscreen. In this manner, touching edges or touching slightly outside the display region actually to be enlarged can be allocated more readily and errors can be avoided.

In a fourth method step 2.4, a touchscreen signal (TSS) is determined after a touch on the display. The touchscreen signal (TSS) itself is allocated in a fifth method step 2.5 to a sensitive region (SB), which is associated with the enlargeable display region ($\alpha$, $\beta$), and accordingly with the enlargeable display region ($\alpha$, $\beta$). The enlargeable display region ($\alpha$, $\beta$), which is determined from the fifth method step 2.5 as an enlargeable display region ($\alpha$, $\beta$) to be enlarged, is enlarged ($\alpha'$, $\beta'$) in a display-region-specific manner in a sixth method step 2.6. For this purpose, dependent upon the identified display region ($\alpha$, $\beta$), the parameters for its enlargement are determined, for example, from a table. In a seventh method step, if required, a scrollbar (BLL) is opened as an operating element, with which a display of the enlarged display region ($\alpha'$, $\beta'$) can be scrolled. The opening can be implemented automatically, if the enlarged display region ($\alpha'$, $\beta'$) can no longer be displayed completely on the display because of the parameters and/or would conceal regions which are particularly important and are therefore not available to the display of the enlarged region. These regions can be marked visually as such. In particular, it is therefore also possible within a displayed window, which for its part cannot be enlarged without concealing other elements, to enlarge a content displayed there. Retaining the window boundaries then makes it necessary to introduce the scroll bars or scroll bars automatically, for example, in order to navigate a relatively large block of text. In an optional eighth method step 2.8, the enlarged display region ($\alpha'$, $\beta'$) is varied and/or used, for example, by a user, by editing the content and/or activating a function. If required, the enlarged display region ($\alpha'$, $\beta'$) is in itself once again defined in the ninth method step 2.9 as an enlargeable display region ($\alpha$, $\beta$). A sensitive region (SB) can again be allocated to the enlargeable display region ($\alpha$, $\beta$) corresponding to the third method step 2.3. The method steps 2.4 to 2.9 following the third method step 2.3 can be reapplied. In a similar manner, it is also possible to proceed with an enlarged display region ($\alpha'$) resulting from this process. Moreover, new enlargeable sub-regions can be defined as display regions $\gamma$ in the enlarged display regions $\alpha'$, $\beta'$.

In alternative exemplary embodiments of the method according to the invention, the method steps 2.7, 2.8, 2.9 and/or 2.7.1 are omitted. It is not compulsory to define or even to enlarge a sub-region, nor is it compulsory to open a scrollbar (BLL), or to vary ($\alpha$, $\beta$) and/or to use a display region or sub-region, nor is it compulsory further to enlarge an already enlarged display region or sub-region (α', β'). All of the sequences of steps represented by arrows in FIG. 2 can be implemented.

The scrollbar can be defined as an enlargeable display region in an auxiliary method step 2.7.1. For its part, corresponding to the third method step 2.3, a sensitive region can be assigned to this enlargeable display region or sub-region. The method steps 2.4 to 2.9 following the third method step 2.3 can also be used in this case. By analogy, it is also possible to proceed with an enlargeable display region or sub-region derived from this process. In this case also, the method steps 2.7 and/or 2.8 can be omitted. It is important for the present method that there can be one or more levels. Within one display region or sub-region already enlarged in several stages, the same functions can again be present in each case as for a display region of the original display.

In the case of an enlargement of an enlargeable display region or an enlargeable sub-region, in which the entire display region is not displayed in an enlarged manner, that is, in its entirety, at the same time, a scrollbar (BLL) can be automatically opened in the display. The scrollbar (BLL) itself can be enlargeable, that is, it can be defined as an enlargeable display region. Accordingly, the regions of the (sub-) display region displayed in an enlarged manner can simply be scrolled. Accordingly, the entire content of the enlargeable and/or enlarged display region or sub-region can then be displayed albeit only by scrolling. In this manner, parts of display regions can be considerably enlarged dependent upon the scroll status, without requiring too much space on the display. Accordingly, displays of regions of considerably enlarged display regions and/or sub-regions are possible, which would extend beyond the display area without the scrolling mechanism. In this context, the scrollbar itself is preferably an enlargeable sub-region, which is displayed in an enlarged manner for its operation.

The following virtual operating elements can also be defined as enlargeable display regions, for example, individual windows or a group of windows, individual window operating elements or a group of window operating elements, scroll bars, individual dialog regions or groups of dialog regions, pull-down menus, pop-up menus, menus with tree structure, tables with individual table elements or groups of enlargeable table elements, block-circuit diagram graphics, individual numerical values or groups of numerical values, individual click boxes or groups of click boxes and individual enlargeable references in texts ("links") or groups of links. Enlargeable menus with enlargeable tree structure can also be used as enlargeable display regions. The tree structure can comprise an operating element and/or information in the form of text, which can be additionally marked in each case with "+" or "−". The enlargement of the height and width can be implemented in each case with a different intensity. For example, the line spacing between text elements or operating elements and/or the font size of text elements can be enlarged or adapted. However, information units which are not operating elements can also be defined as enlargeable display regions or sub-regions.

A sensitive region for enlargement and/or an active region for the activation of its function can be allocated to an operating element either as an enlargeable and/or enlarged display region. The sensitive region and the active region can be designed in each case especially in such a manner that a user can clearly distinguish which function is triggered by touching the screen. An enlarged active region and also an enlarged sensitive region can be allocated to an enlarged operating element.

After the expiry of a given time or after a touch on the touchscreen provided for this purpose, the enlargement is reversed (step 2.10). The time interval after the expiry of which the enlargement is cancelled, is restarted with every new action, which is executed within the enlarged display region. Accordingly, a cancellation of the enlargement during operation is prevented. A touch on a region to which no sensitive region or a sensitive region of another enlargeable display region is allocated can be used, for example, as a touch for reversing an enlargement.

Figure 3:
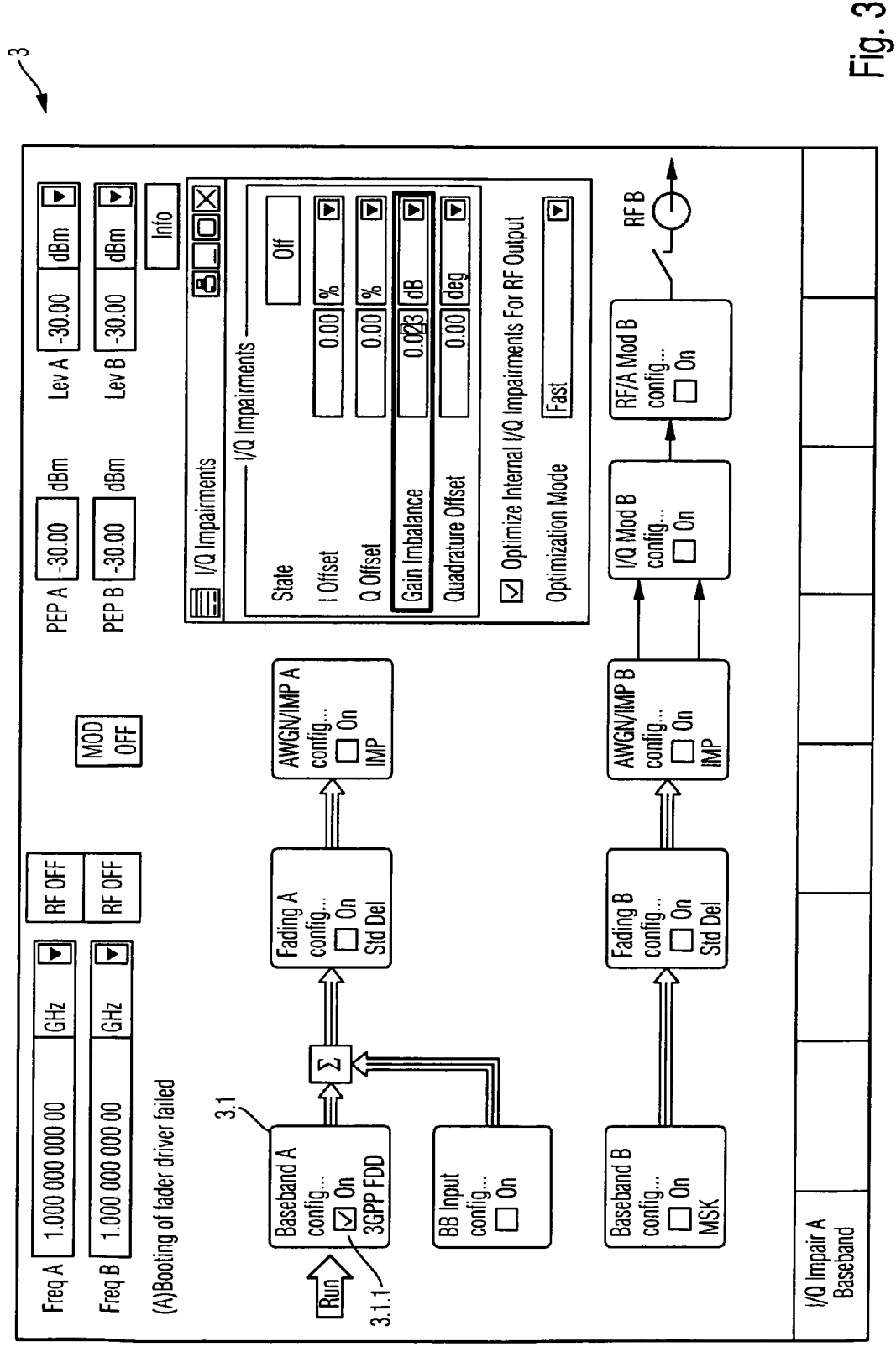
FIG. 3 shows a first screen display.

FIG. 3 shows a first screen display 3. In the first screen display 3, various enlargeable display regions are shown. In particular, an enlargeable first operating element 3.1 is shown. The enlargeable first operating element 3.1 comprises a click box 3.1.1. A sensitive region (not shown) is allocated to the enlargeable first operating element 3.1. An enlargement of the enlargeable first operating element 3.1 is caused by touching the sensitive region of the enlargeable first operating element 3.1 by means of the touchscreen. An active region (not shown) in the enlargeable first operating element 3.1 is allocated to the click box 3.1.1. By touching the active region of the enlargeable click box 3.1.1 in the not yet enlarged display, an implementation of the function of the click box 3.1.1 is caused by means of the touchscreen. As an alternative, no active region by means of which a triggering of a function can be caused may be allocated to the click box 3.1.1. An accidental activation of the click box 3.1.1 in the non-enlarged status can therefore be prevented.

Dependent upon the spacing distance between active regions, different methods are possible. If the spacing distance between the active regions is large enough to allow a secure selection of the active regions with the touchscreen, the active region, for example, a click box 3.1.1 or another control button in which a touchscreen signal is actively recognized as a touch and allocated to the corresponding click box 3.1.1 or other control button, is enlarged beyond the visible size of the corresponding click box 3.1.1 or other control button. A visible enlargement of the corresponding click box 3.1.1 is not required in this case. However, for example, if the spacing distance between the active regions is too small, the entire window 3.1 and/or the other control button is additionally enlarged together with the corresponding active regions, such as the click box 3.1.1 and/or further active regions, in order to enlarge the spacing distance for example between the click box 3.1.1 and the control button "config . . . ", thereby avoiding a mutual concealment during the enlargement. The distinction between the two cases can be implemented either at the time of developing the program code for the operating surface of the measuring instrument or automatically at the time of execution of the code by a suitable program section which measures the spacing distance between the active regions. In this case, an adaptation of the non-enlarged display region 3.1, for example, to different screen sizes, would automatically be taken into consideration. In the case of large spacing distances between active regions of display regions, the active regions can therefore be enlarged or already-large active regions can be used.

Figure 4:
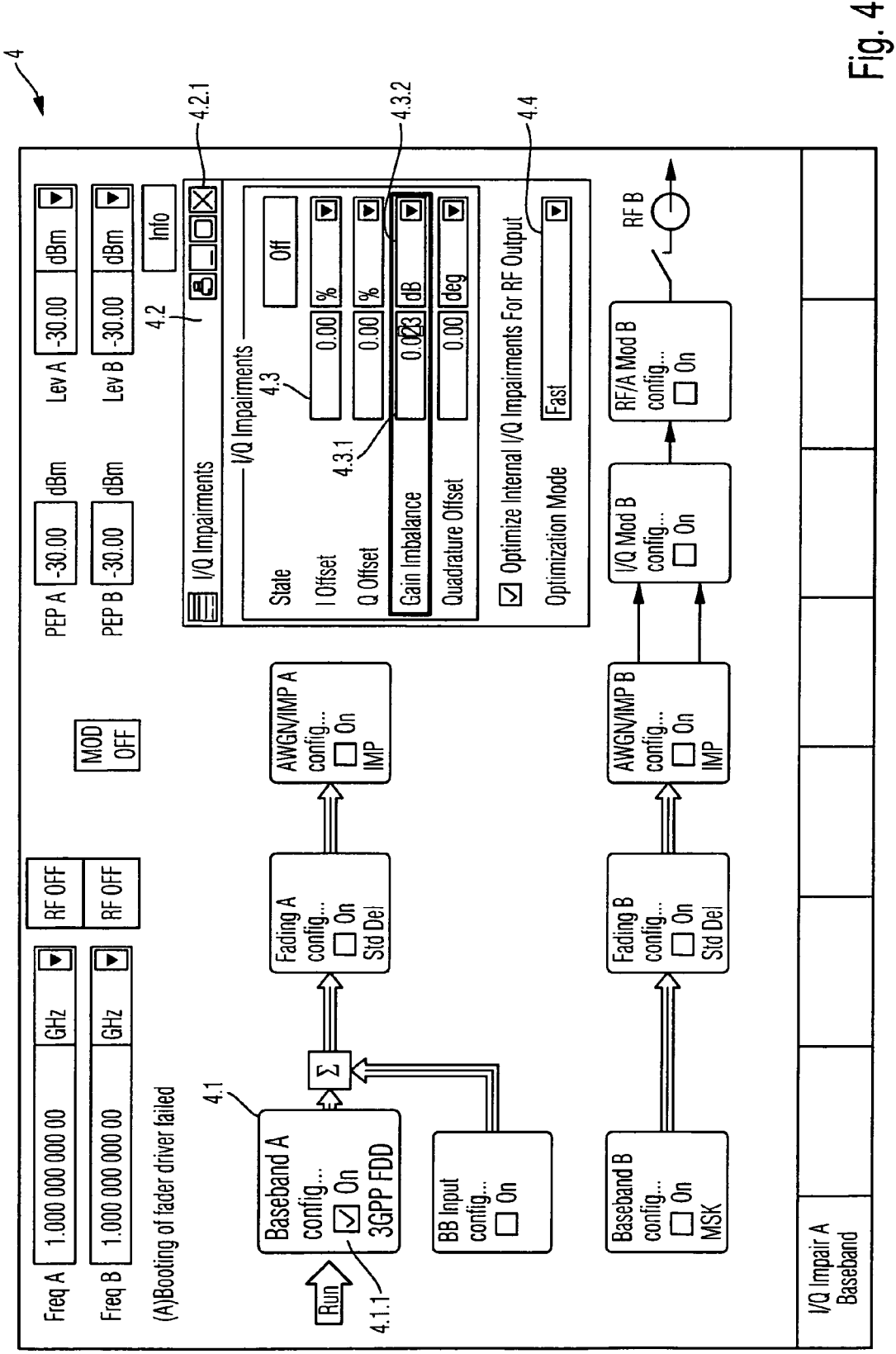
FIG. 4 shows a second screen display.

FIG. 4 shows a second screen display 4. In the second screen display 4, the various enlargeable display regions and an enlarged first operating element 4.1 are shown. The enlarged first operating element 4.1 appears after a touch on the first operating element 3.1 in FIG. 3 and comprises an enlarged click box 4.1.1. An active region (not shown) is allocated to the enlarged first operating element 4.1. Within the enlarged first operating element 4.1, an active region (not shown) is also allocated to the enlarged click box 4.1.1. By touching the active region of the enlarged click box 4.1.1 by means of the touchscreen, a triggering of the function of the click box 4.1.1 is caused. The targeted operation of the two functions "config . . . " and "on" is accordingly facilitated.

Moreover, an enlarged window 4.2 is shown in the second screen display 4. The enlargeable first window 4.2 comprises an enlargeable first window operating element 4.2.1. A sensitive region (not shown) is allocated to the enlargeable first window 4.2. By touching the sensitive region of the enlargeable first window 4.2 by means of the touchscreen, an enlargement of the enlargeable first window 4.2 is caused. A dedicated sensitive region (not shown) is allocated to the enlargeable first window operating element 4.2.1 in the enlargeable first window 4.2. An enlargement of the enlargeable first window operating element 4.2.1 by means of the touchscreen is caused by touching the dedicated sensitive region of the enlargeable first window operating element 4.2.1. No active region by means of which a triggering of a function can be caused is allocated to the non-enlarged, enlargeable first window operating element 4.2.1. An accidental activation of the enlargeable first window operating element 4.2.1 is therefore impossible.

Furthermore, an enlargeable first window content 4.3 is shown in the second screen display 4. The enlargeable first window content 4.3 comprises an enlargeable first numerical field 4.3.1, an enlargeable first combo-box 4.3.2, also known as a pull-down menu, for adjusting measurement units and a second enlargeable combo-box 4.4. In each case a dedicated sensitive region (not shown) is allocated to the enlargeable first window content 4.3, the enlargeable first numerical field 4.3.1, the enlargeable first combo-box 4.3.2 and the second enlargeable combo-box 4.4.

Figure 9:
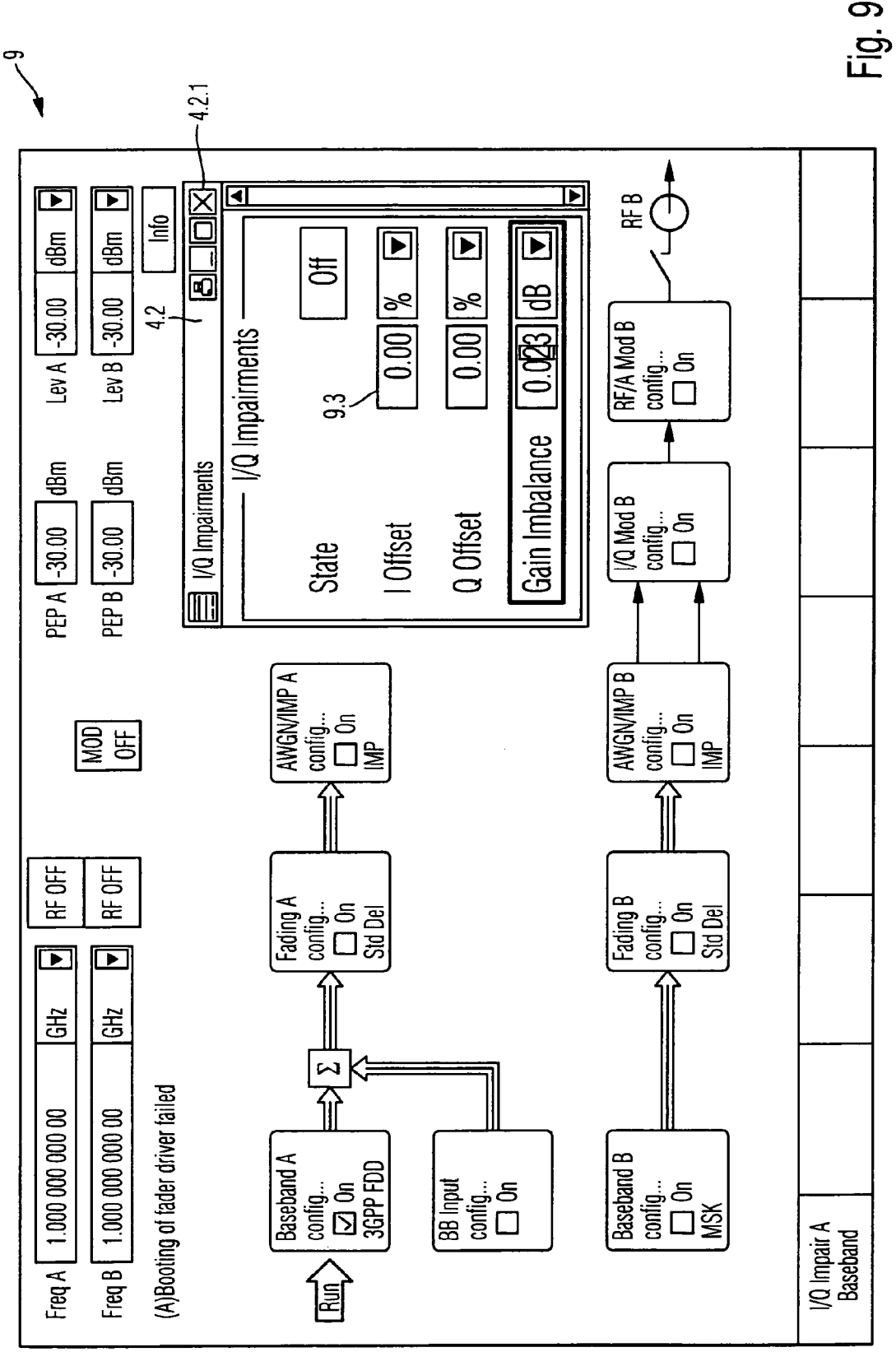
FIG. 9 shows a seventh screen display.

By touching the sensitive region of the enlargeable first window content 4.3 by means of the touchscreen, an enlargement of the enlargeable first window content 4.3 is caused (see FIG. 9).

Figure 8:
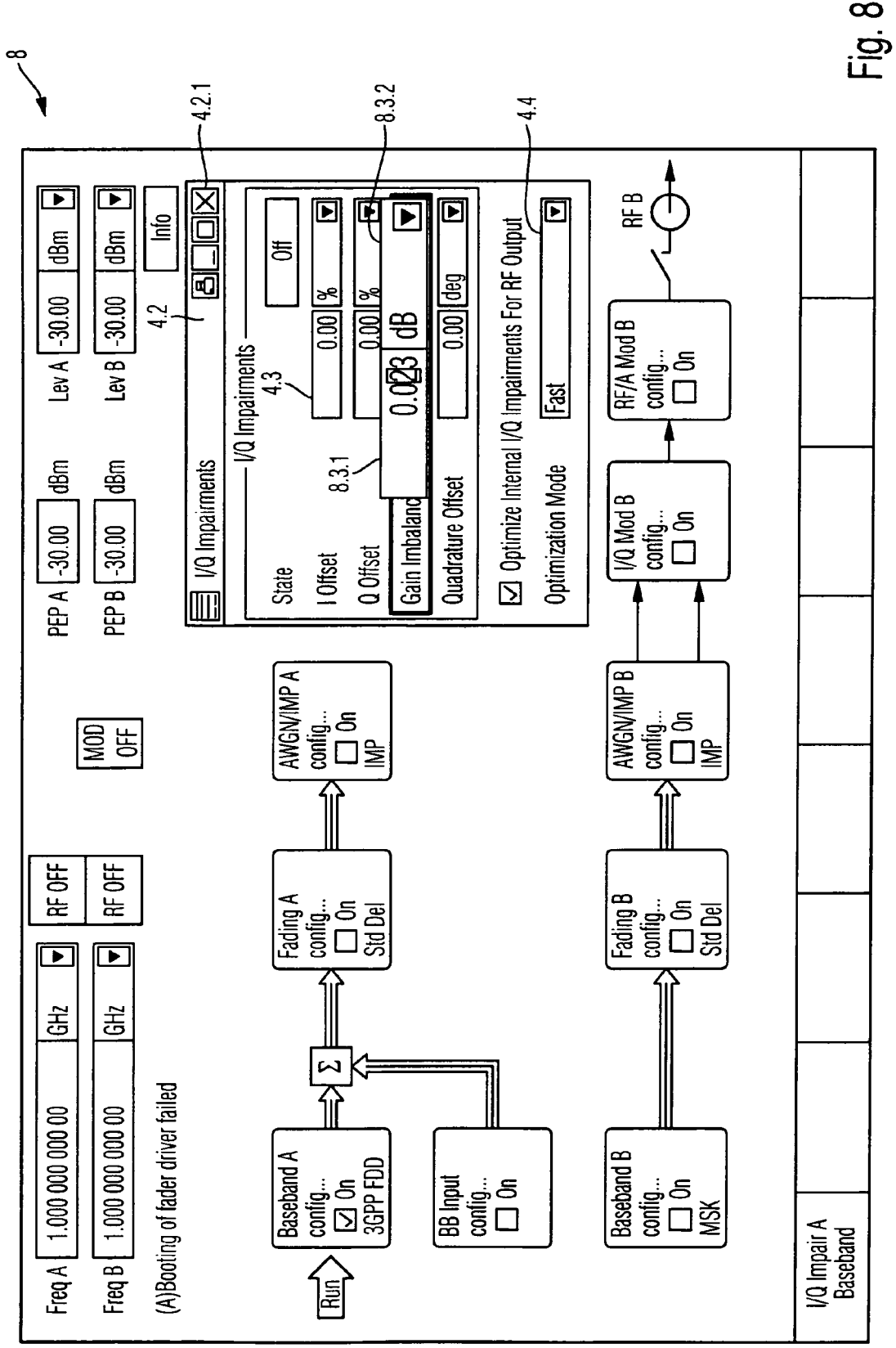
FIG. 8 shows a sixth screen display.

By touching the sensitive region of the enlargeable first numerical field 4.3.1 by means of the touchscreen, an enlargement of the enlargeable first numerical field 4.3.1 is caused (see FIG. 8).

By touching the sensitive region of the enlargeable first combo-box 4.3.2 by means of the touchscreen, an enlargement of the enlargeable first combo-box 4.3.2 is caused (see FIG. 8).

Through the operation of the second enlargeable combo-box 4.4 by means of the touchscreen, a pop-up of an enlarged first pull-down menu 10.1 (see FIG. 10) is caused. In this case, a directly enlarged display is achieved by the operation.

Figure 5:
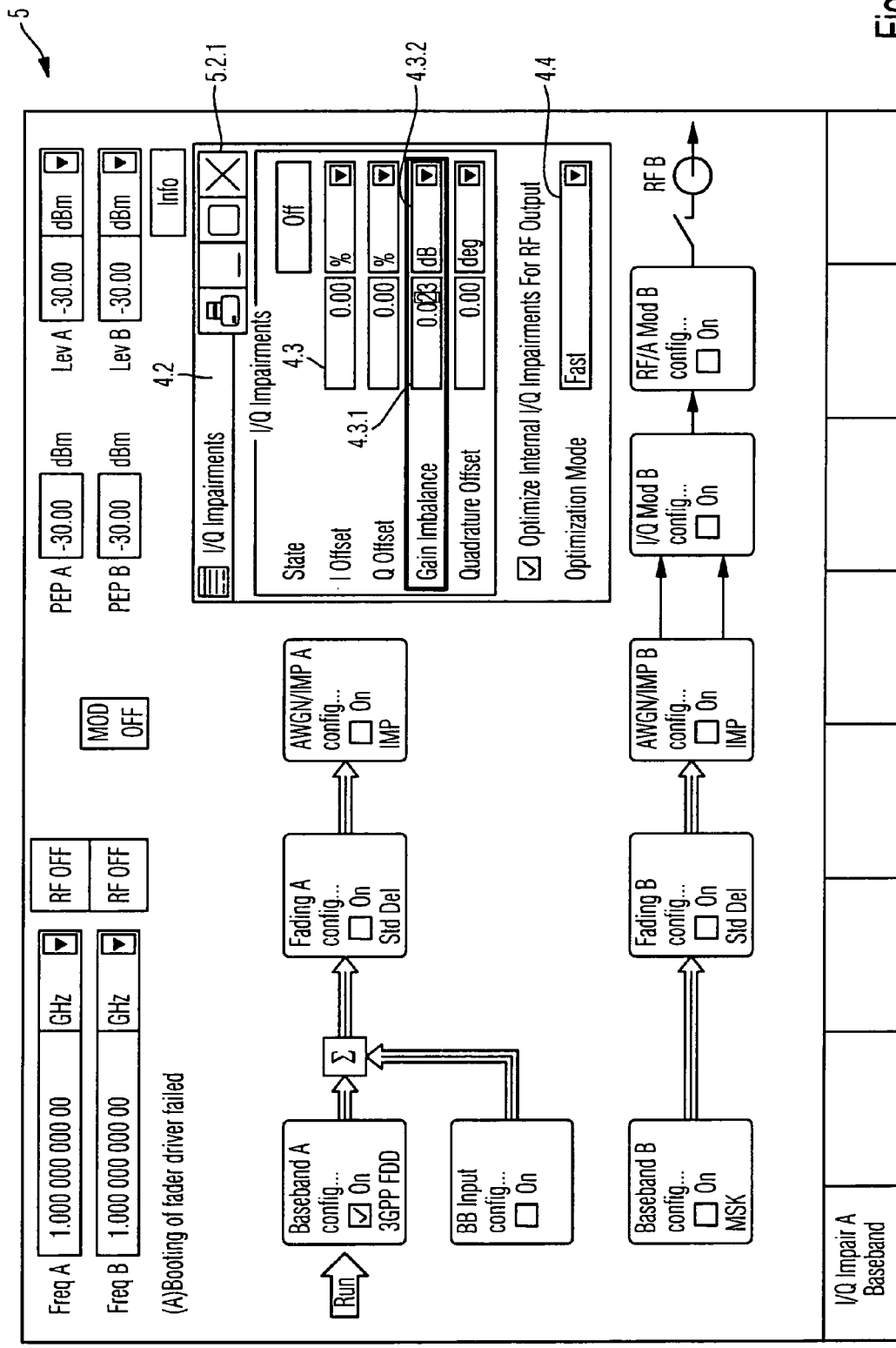
FIG. 5 shows a third screen display.

FIG. 5 shows a third screen display 5. In the third screen display 5, the enlarged first window operating element 5.2.1 from FIG. 4 (originating from 4.2.1) is shown. Various active regions (not shown) are allocated to the enlarged first window operating element 5.2.1. By touching an active region of the enlarged first window operating element 5.2.1 by means of the touchscreen, a triggering of a function specific for the corresponding active region is caused.

Figure 6:
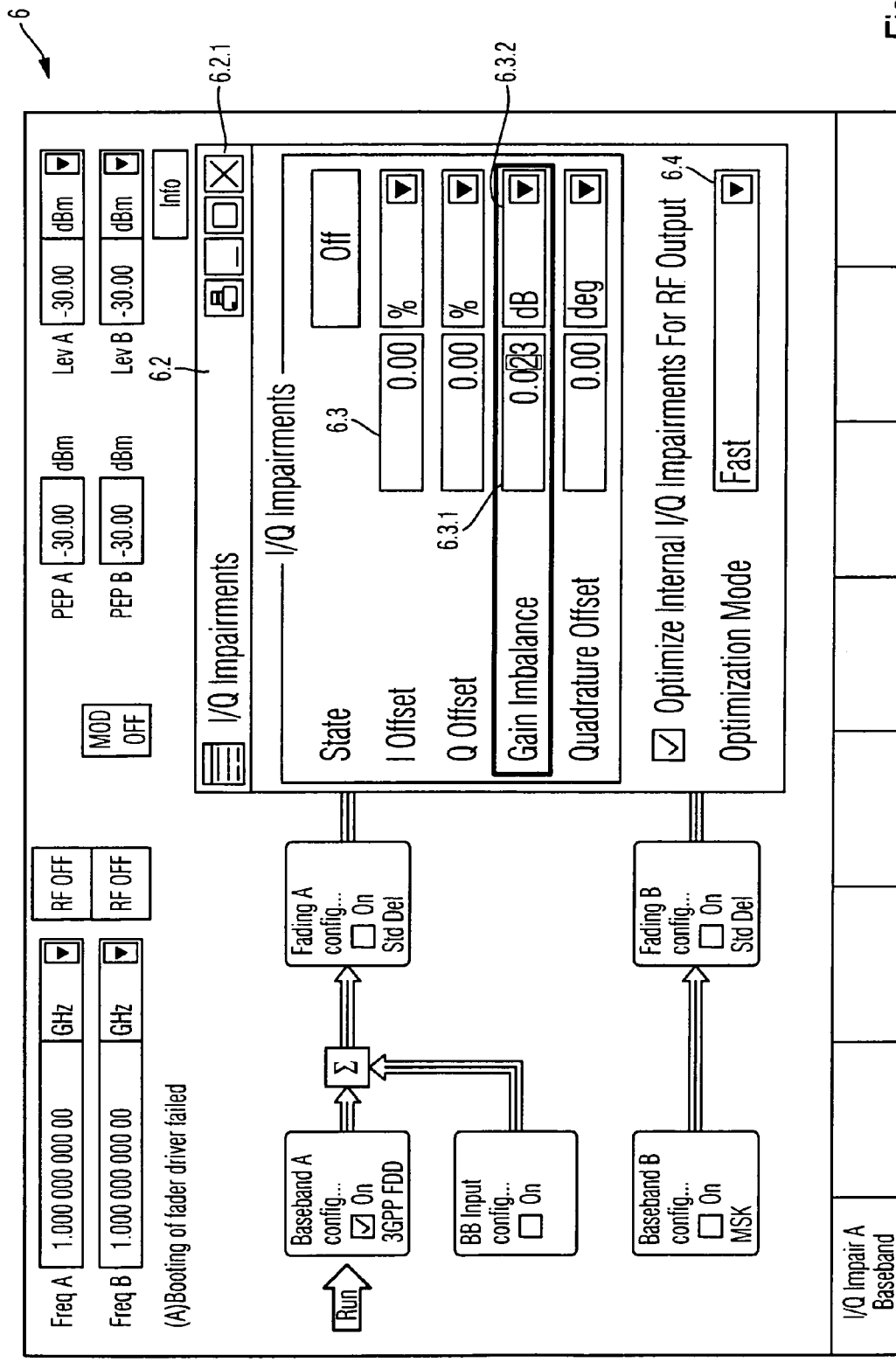
FIG. 6 shows a fourth screen display.

FIG. 6 shows a fourth screen display 6. In the fourth screen display 6, a first window 6.2 is shown enlarged in its entirety. The enlarged a first window 6.2 from FIG. 4 (originating from 4.2) comprises an enlarged and further enlargeable first window operating element 6.2.1 (originating from 4.2.1) and an enlarged and further enlargeable first window content 6.3 (originating from 4.3). The enlarged and further enlargeable first window content 6.3 comprises an enlarged and further enlargeable first numerical field 6.3.1 (originating from 4.3.1), an enlarged and further enlargeable first combo-box 6.3.2 (originating from 4.3.2) and a second enlarged and further enlargeable combo-box 6.4 (originating from 4.4).

The entire dialog box including its elements 6.3.1, 6.3.2 and the area which the dialog box requires have been enlarged here. However, only a single element 6.3.1, 6.3.2 or a group of elements as shown in FIG. 8 can also be enlarged in the dialog box. In this case, under some circumstances, fewer dialog-box elements (generally lines) are displayed, and it may possibly be necessary to scroll. A scroll bar can be used for this purpose, which is displayed in addition to the enlarged display region or opened in an appropriate manner. To ensure that the user is immediately shown the required region of the dialog box, the region of the dialog box, which has been touched by the user's finger (when the dialog box had not yet been enlarged), is displayed once again after the enlargement at the position, for example, of the user's finger. Accordingly, the entire dialog box is shown to the user enlarged around the position marked, for example, by the user's finger. In both of the above cases, the enlargement of height and width can be implemented independently in a different manner from one another. For example, only the line spacing can be enlarged without changing the width of the dialog box. The parameters (here the enlargement factor in the x and y direction) are previously specified for the special dialog box.

A dedicated sensitive region (not shown) is allocated respectively to the enlarged and further enlargeable first window operating element 6.2.1, the enlarged and further enlargeable first window content 6.3, the enlarged and further enlargeable first numerical field 6.3.1, the enlarged and further enlargeable first combo-box 6.3.2 and the enlarged and further enlargeable second combo-box 6.4.

Figure 7:
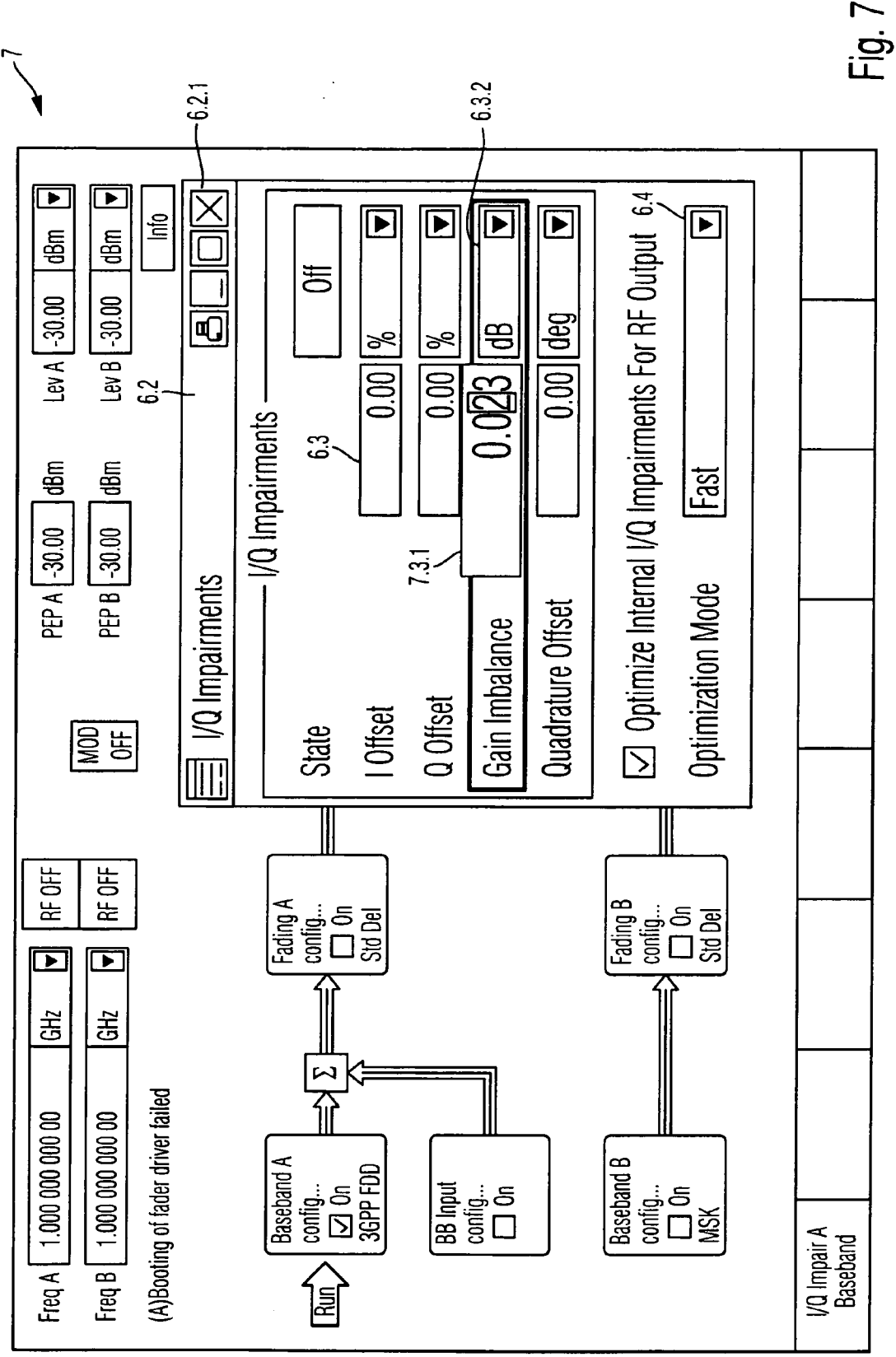
FIG. 7 shows a fifth screen display.

Through a touch on the sensitive region of the enlarged and further enlargeable first numerical field 6.3.1 by means of the touchscreen, a further enlargement of the enlarged and further enlargeable first numerical field 6.3.1 is caused, as shown in FIG. 7 with reference to the further enlarged first numerical field 7.3.1.

A further enlargement may not be required if an adequately large display has already been achieved through the first enlargement step.

FIG. 8 shows a sixth screen display with an enlarged first numerical field 8.3.1 (originating from 4.3.1) and an enlarged first combo-box 8.3.2 (originating from 4.3.2). In the illustrated example, the entire entry field consisting of the first numerical field 8.3.1 and the first combo-box 8.3.2 is enlarged. This is implemented by defining an entry field which contains the entire numerical value including the selectable units field, as an enlargeable display region or a further enlargeable sub-region. Accordingly, the selection of a given number via touchscreen is facilitated. A block cursor can be used to mark a decimal position within the region displayed in an enlarged manner, which can be varied, for example, using the rotary knob. If numerical values are displayed in different sizes (dependent upon relevance) within the respective operating concept, the enlargement function can also be restricted to the relatively smaller numerical display. If numerical values are displayed within a dialog box, the enlargement can relate to the dialog box or only to the numerical value or to both. That is to say, upon touching the numerical value in the entry field (here, the first numerical field 8.3.1), only the latter is enlarged. Upon touching the dialog box, this is enlarged together with the numerical value within the entry field. If the numerical value or the entry field is touched after touching the dialog box within the enlarged dialog box, this can the enlarged again.

As an alternative to FIG. 6, FIG. 9 shows a seventh screen display 9 with an enlarged first window content 9.3 (originating from 4.3) in the first window 4.2, which is not enlarged here. The enlarged first window content 9.3 is not displayed in its entirety in the first window 4.2, because only the window content but not the window frame has been enlarged. For navigation within the content displayed in an enlarged manner, a scrollbar is automatically opened in the illustrated example.

Figure 10:
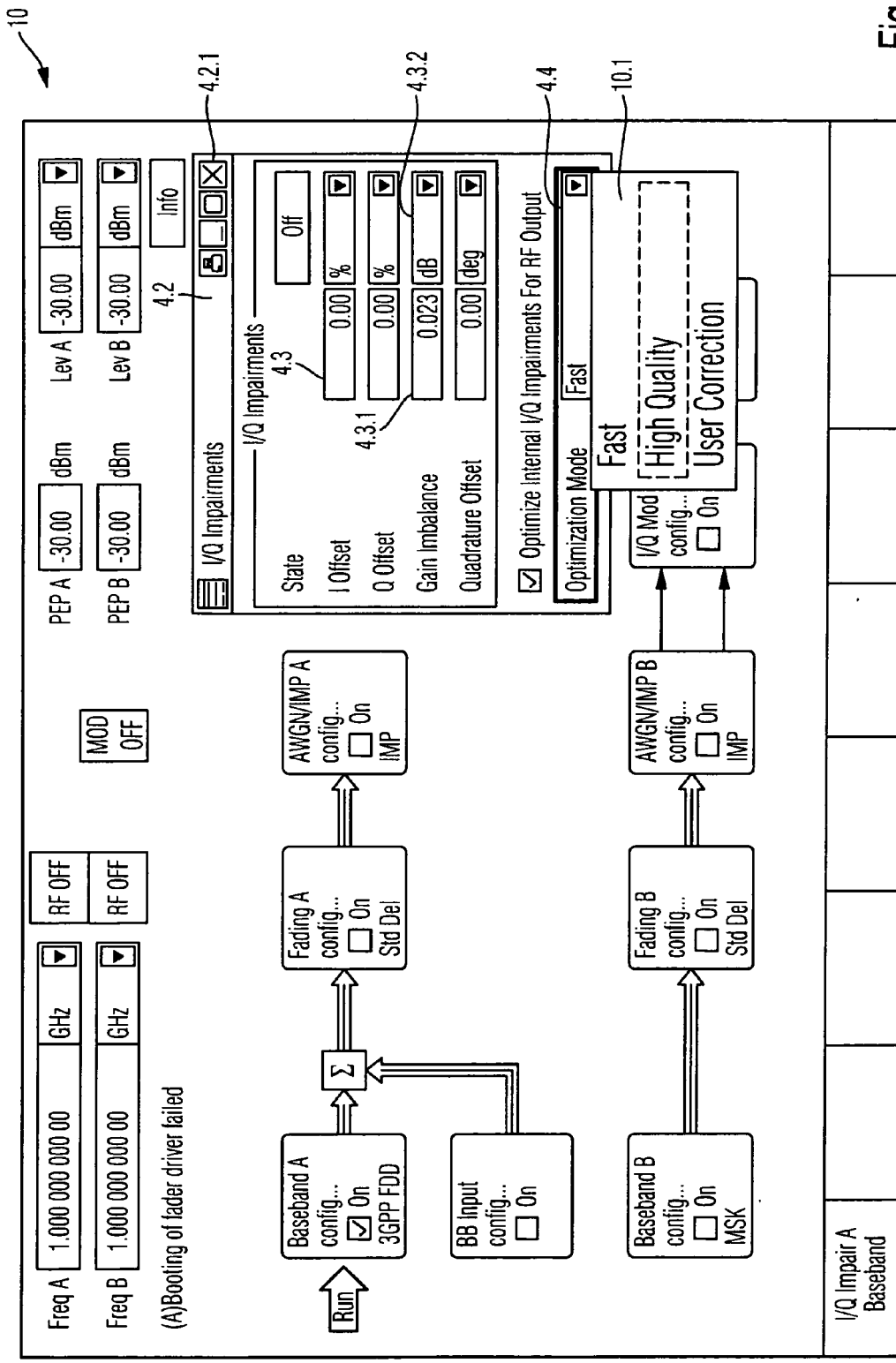
FIG. 10 shows an eighth screen display.

FIG. 10 shows an eighth screen display 10 with an enlarged pull-down menu 10.1.

If a new dialog box is opened by touching a region of the touchscreen allocated to a function, it is advantageous to make the display dependent upon the opening procedure. In the case of an operation, for example, by means of keys or mouse, a dialog window can be opened in a basic size. This dialog window can be defined as an enlargeable display region. In the case of a further touch on the touchscreen in a sensitive, allocated area, the enlarged display is brought about. By contrast, if the original opening is caused by a touch on the touchscreen, the enlarged display is selected immediately, because a further operation by means of the touchscreen is facilitated by the immediate enlargement.

Figure 11:
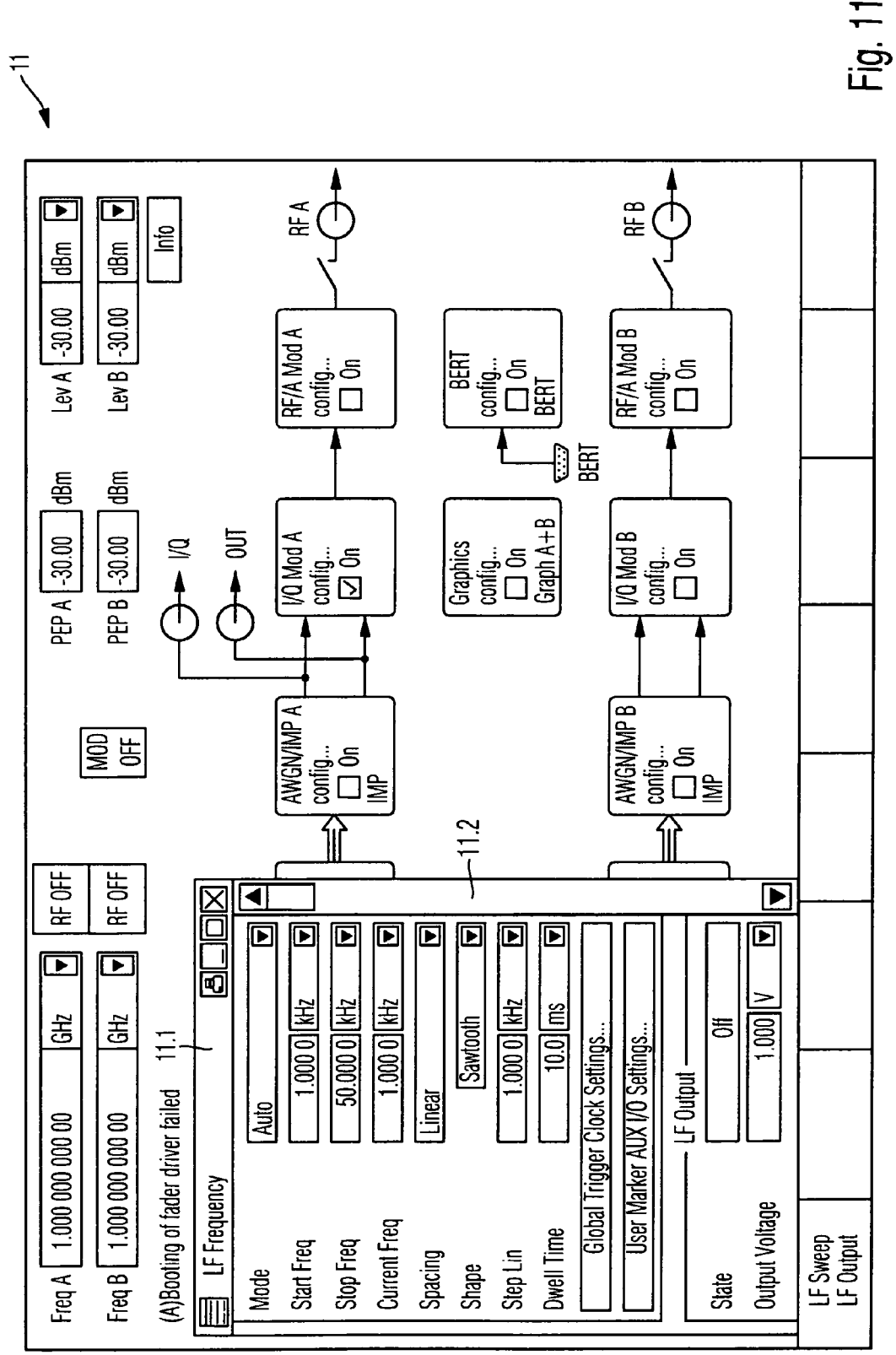
FIG. 11 shows a ninth screen display.

FIG. 11 shows a ninth screen display 11 with an enlargeable second window is 11.1 and an enlarged first scrollbar 11.2. The enlarged first scrollbar 11.2 originates from an enlargeable first scrollbar (not shown). Since the length of the scrollbar (scrollbar) generally corresponds to the respective window size, the length is not changed. The corresponding enlargement factor would therefore be, for example, 1. By contrast, the width of the scrollbar 11.2 is enlarged and similarly the arrow keys and possibly the slider button. Accordingly, pressing the slider button or sliding by means of the arrow keys with the help of the touchscreen is facilitated. In principle, however, length, width and position of the enlarged scrollbar 11.2 can be specified independently from one another in an individual manner. These considerations of course also apply for scrollbars arranged horizontally. By analogy, in that context, the width is left unchanged and the height of the elements is modified.

Figure 12:
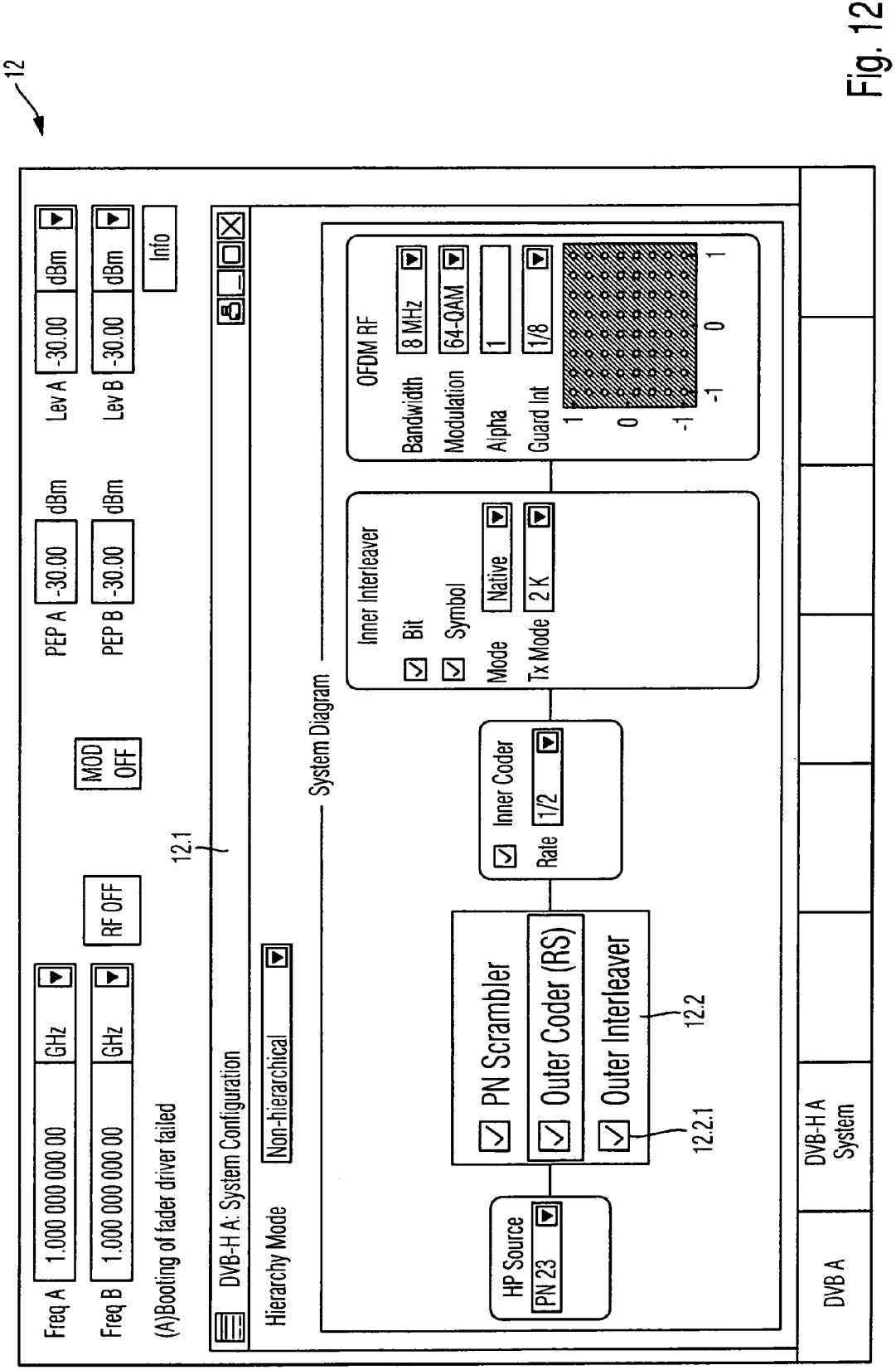
FIG. 12 shows a tenth screen display.

FIG. 12 shows a tenth screen display 12 with a third window 12.1, with an enlarged first click-box window 12.2 in which a first click box 12.2.1 is arranged. The enlarged first click-box window 12.2 originates from an enlargeable first click-box window (not shown).

Figure 13:
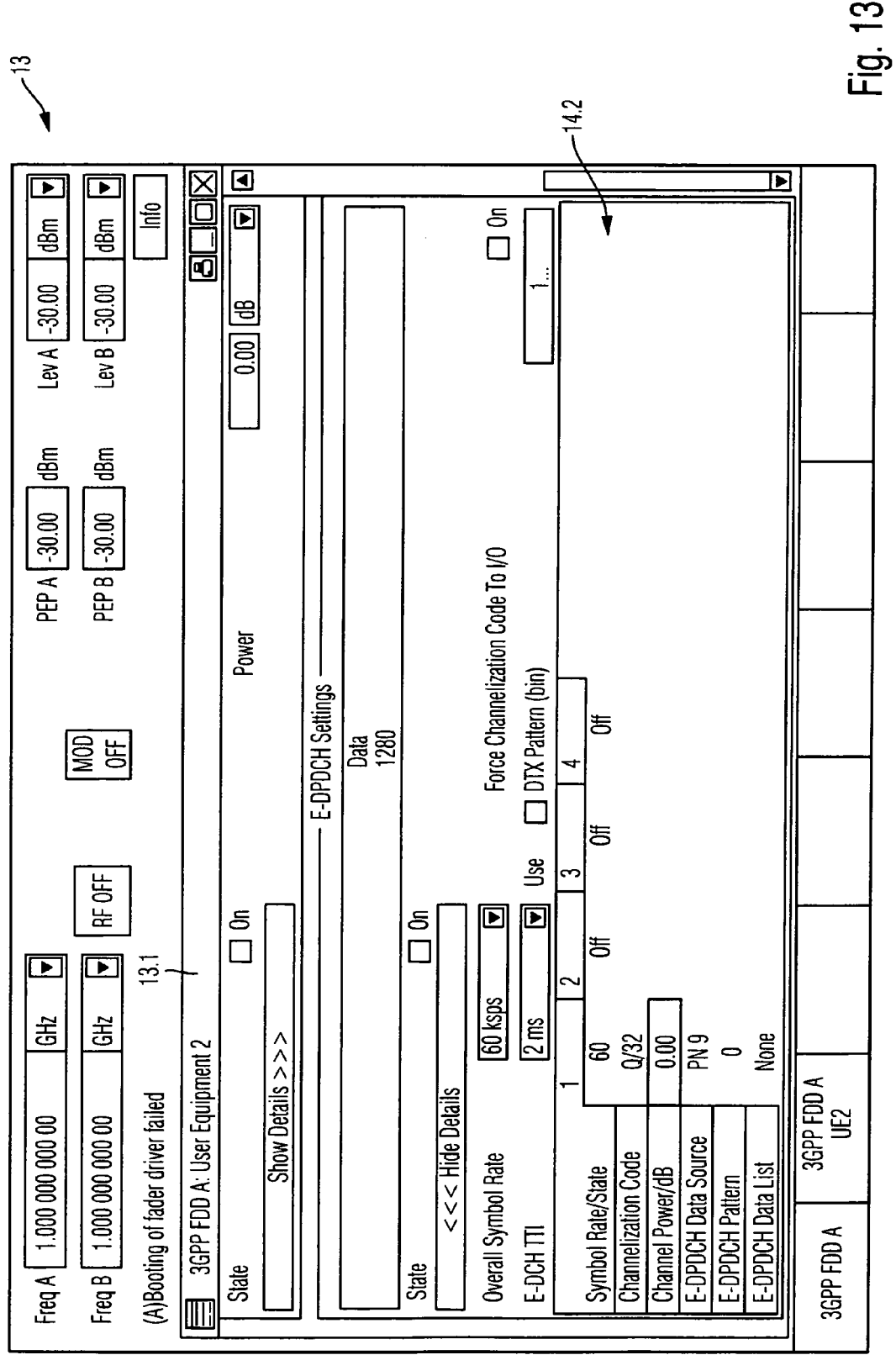
FIG. 13 shows an eleventh screen display.
Figure 14:
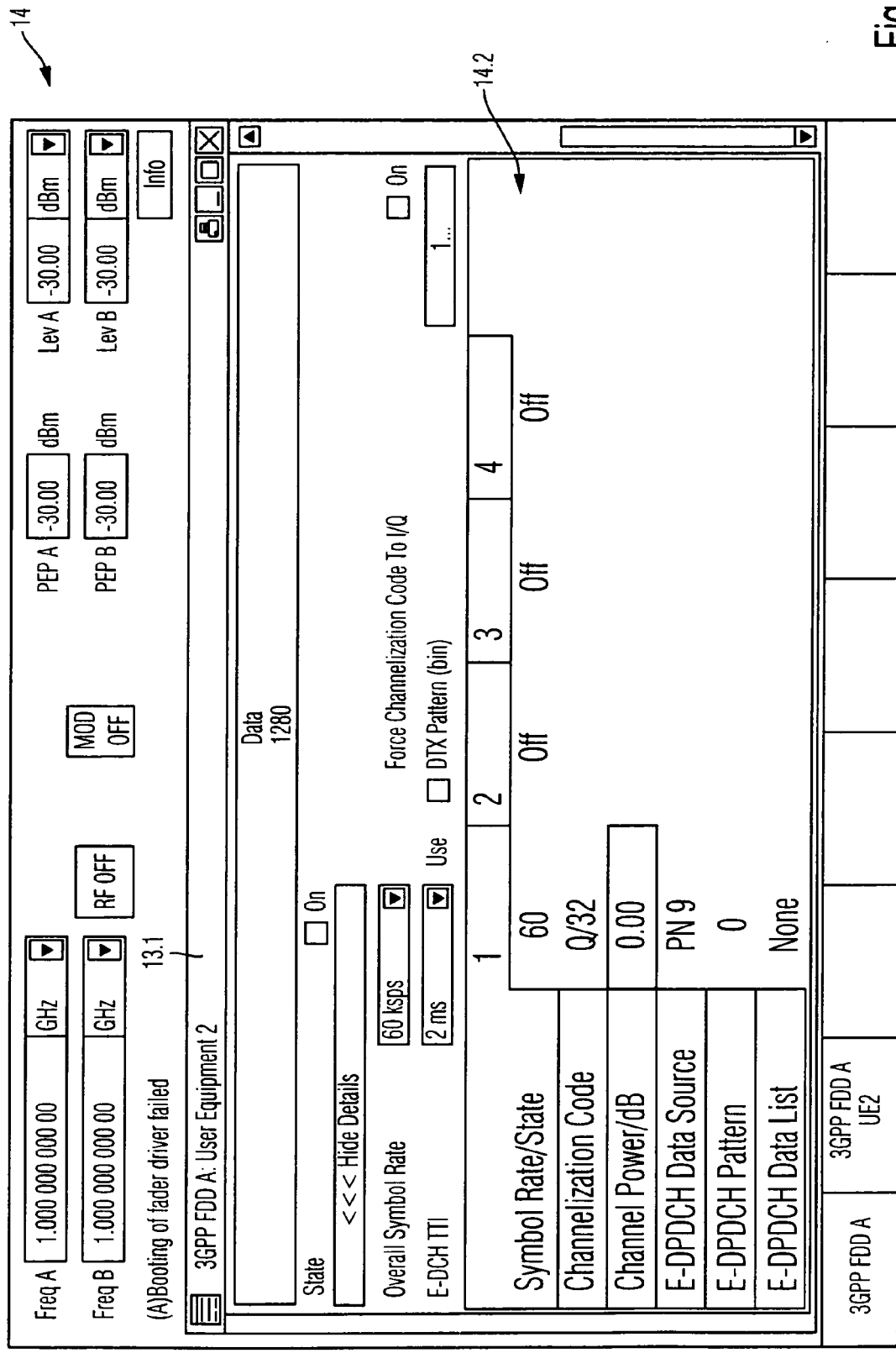
FIG. 14 shows a twelfth screen display.

FIG. 13 shows an eleventh screen display 13 with a third window 13.1 with a first table region 14.2, to which a sensitive region (not shown) is allocated, which, when touched by means of a touchscreen, leads to an enlargement of the enlargeable first table region 14.2, as shown in FIG. 14. The enlargeable region is defined, for example, by a portion of 5 columns×6 lines of the table region 14.2, which is fitted upon enlargement into the available window space.

However, individual table elements or groups of table elements of the non-enlarged table region 14.2 can also be enlarged separately, if these are defined as sub-regions of the display region forming the table. As already explained above, it is then also possible to scroll using a scrollbar opened and appropriately orientated, for example, aligned horizontally or vertically. To ensure that a user is immediately shown the required table elements, the region of the first table region 14.2, which the user has touched, for example, with a finger (before the table had been enlarged), is once again displayed after the enlargement at the position of the user's finger. Accordingly, the table appears in an enlarged manner around the position, for example, marked by a finger, however, no magnifying effect occurs, because the region to be enlarged is defined with reference to the object allocated to the touch. Furthermore, as already described, individual table elements or groups of table elements of a table already enlarged together with its table elements can be further enlarged.

FIG. 14 shows a twelfth screen display 14 with an enlarged first table region 14.2 in the third window 13.1. In order to create space for the enlarged table region, the upper part of the window content from FIG. 12 is here no longer visible.

Figure 15:
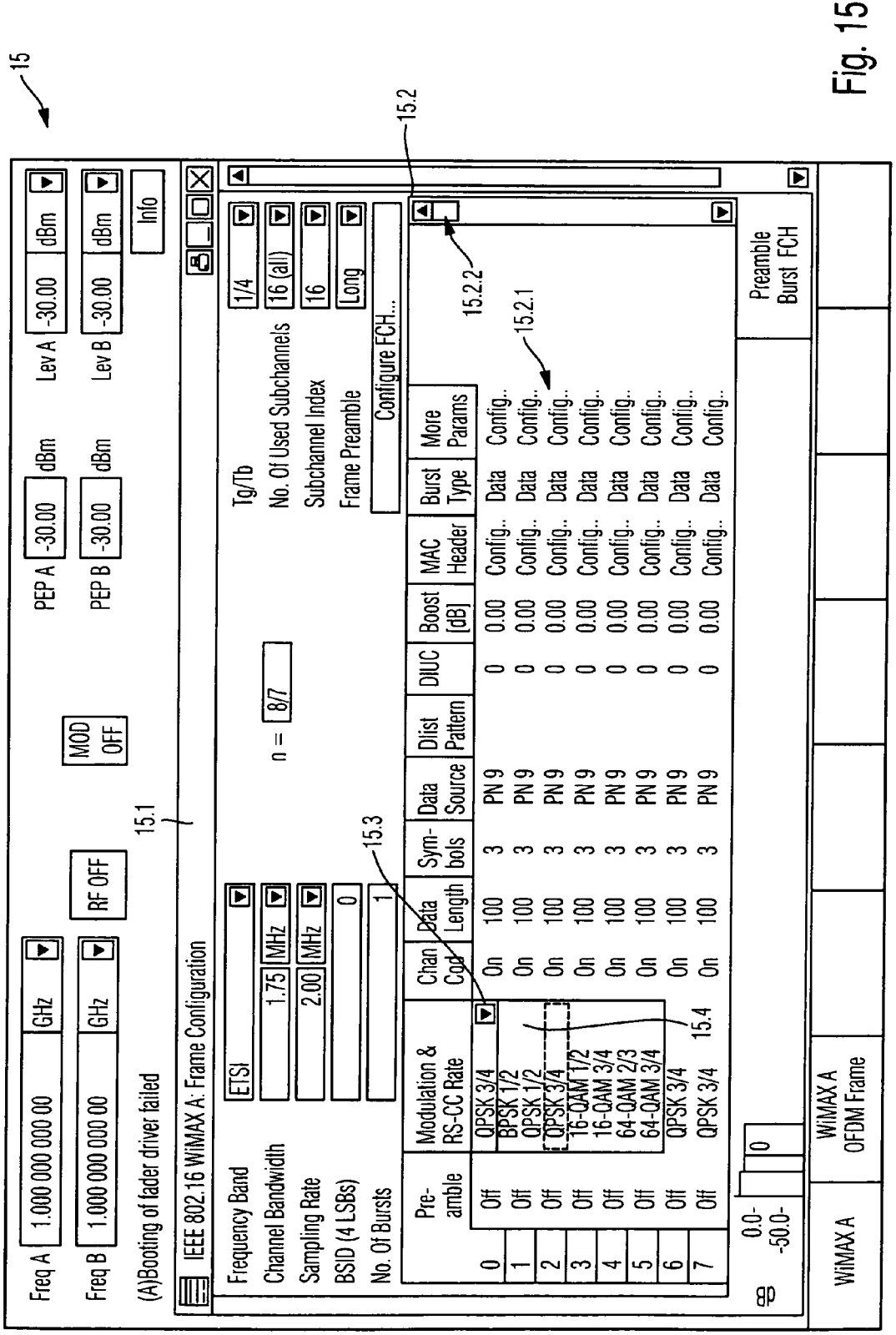
FIG. 15 shows a thirteenth screen display.

FIG. 15 shows a thirteenth screen display 15 with a fourth window 15.1 with a first region 15.2, an enlargeable second table region 15.2.1 with an adaptable scrollbar 15.2.2, an enlargeable third combo-box 15.3 and an enlargeable second pull-down menu 15.4 allocated to the latter.

Figure 16:
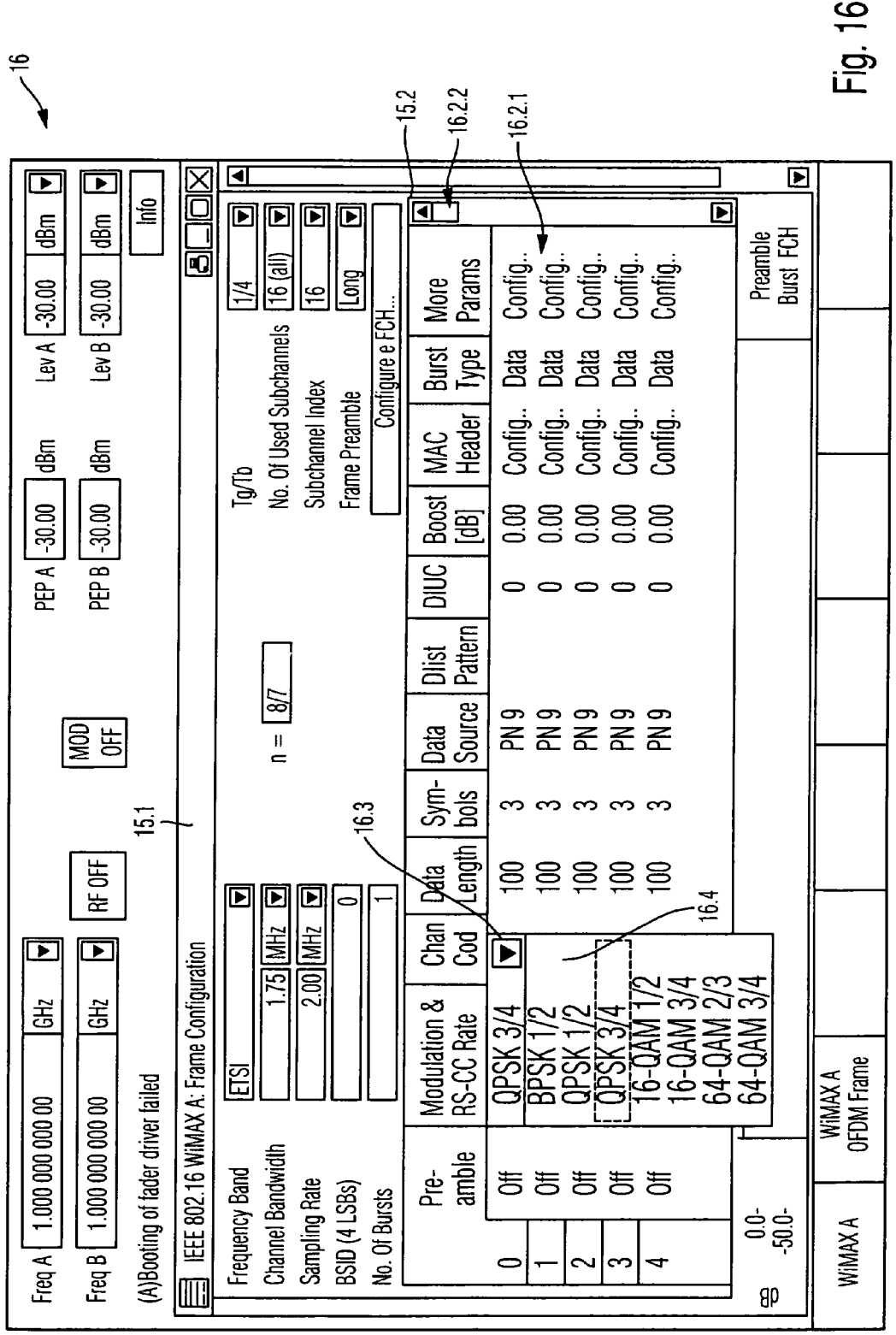
FIG. 16 shows a fourteenth screen display.

FIG. 16 shows a fourteenth screen display 16 with the fourth window 15.1 with the first region 15.2 with an enlarged second table region 16.2.1 (originating from 15.2.1) of a third combo-box 16.3 (originating from 15.3) enlarged once again in the enlarged second table region 16.2.1 and a second pull-down menu 16.4 (originating from 15.4) allocated to the latter. The adapted scrollbar 16.2.2 is not enlarged. On the contrary, the size of the bar of the scrollbar is changed. Accordingly, the ratio between the size of the displayed regions of the enlarged first table 16.2.1 and the overall size of the enlarged first table 16.2.1 is correctly represented.

Figure 17:
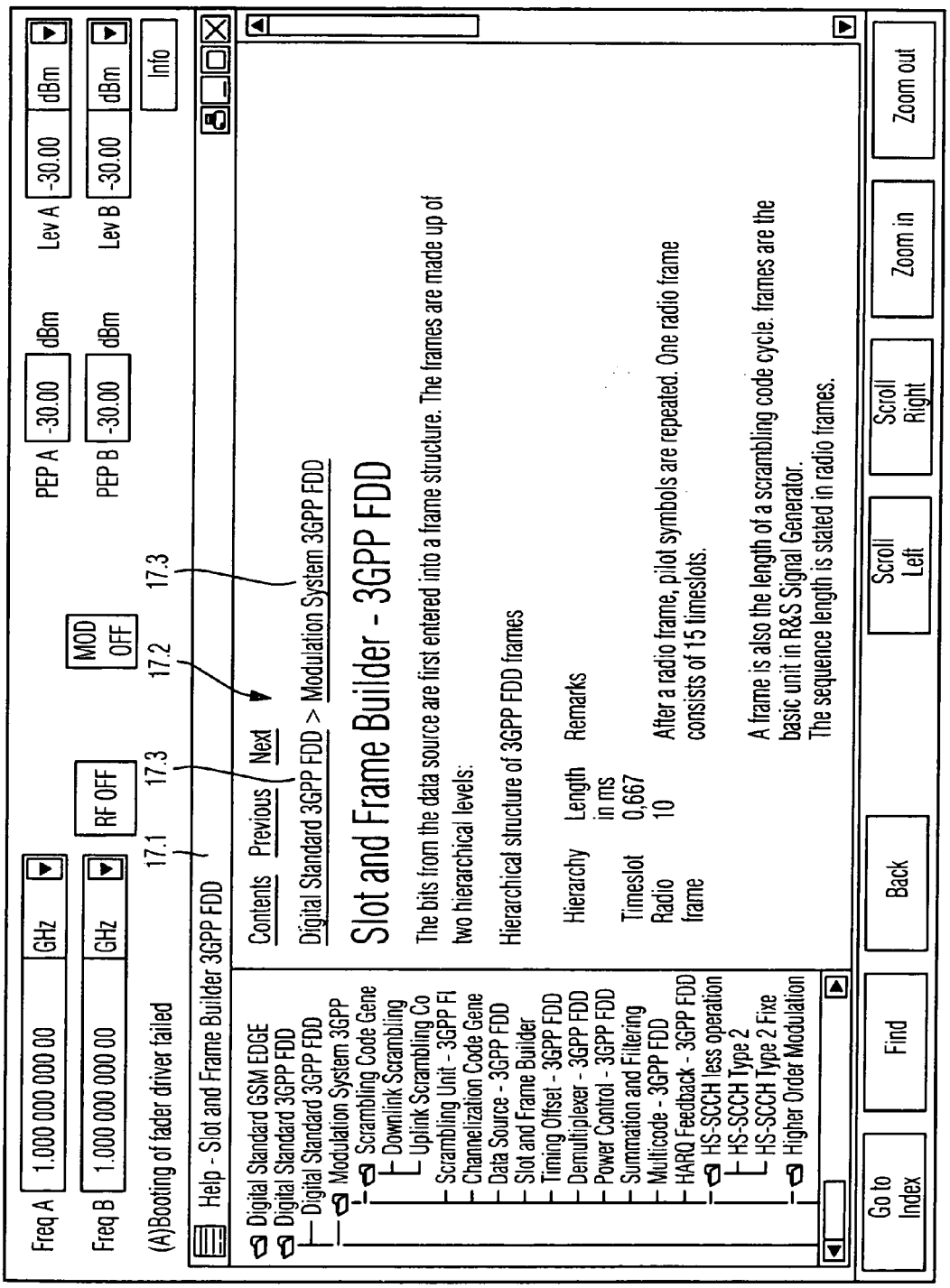
FIG. 17 shows a fifteenth screen display.

FIG. 17 shows a fifteenth screen display 17 with a fifth window 17.1, with an enlargeable second region 17.2 and with enlargeable links 17.3. Enlargeable references (links) 17.3 are shown in a text window as enlargeable display region 17.2. Here, the procedure is analogous to the active regions. If the spacing distance between the links 17.3 is sufficiently large to allow a secure selection by touch screen, the display need not be altered, so no enlargement is used. However, if the spacing distance is too small, the font size and/or the spacing distance of the links 17.3 relative to one another is increased. This can be implemented through a relatively larger line spacing and/or through a relatively larger lateral spacing distance (corresponding to the spaces between words) between the links 17.3. As a result of these measures, less text per unit area is displayed. It is then possible to scroll using an open and appropriately orientated scrollbar, for example, aligned horizontally or vertically. In both cases, the active region of a link in which a touchscreen signal is active can be enlarged beyond the visible size of the corresponding link 17.3.

Figure 18:
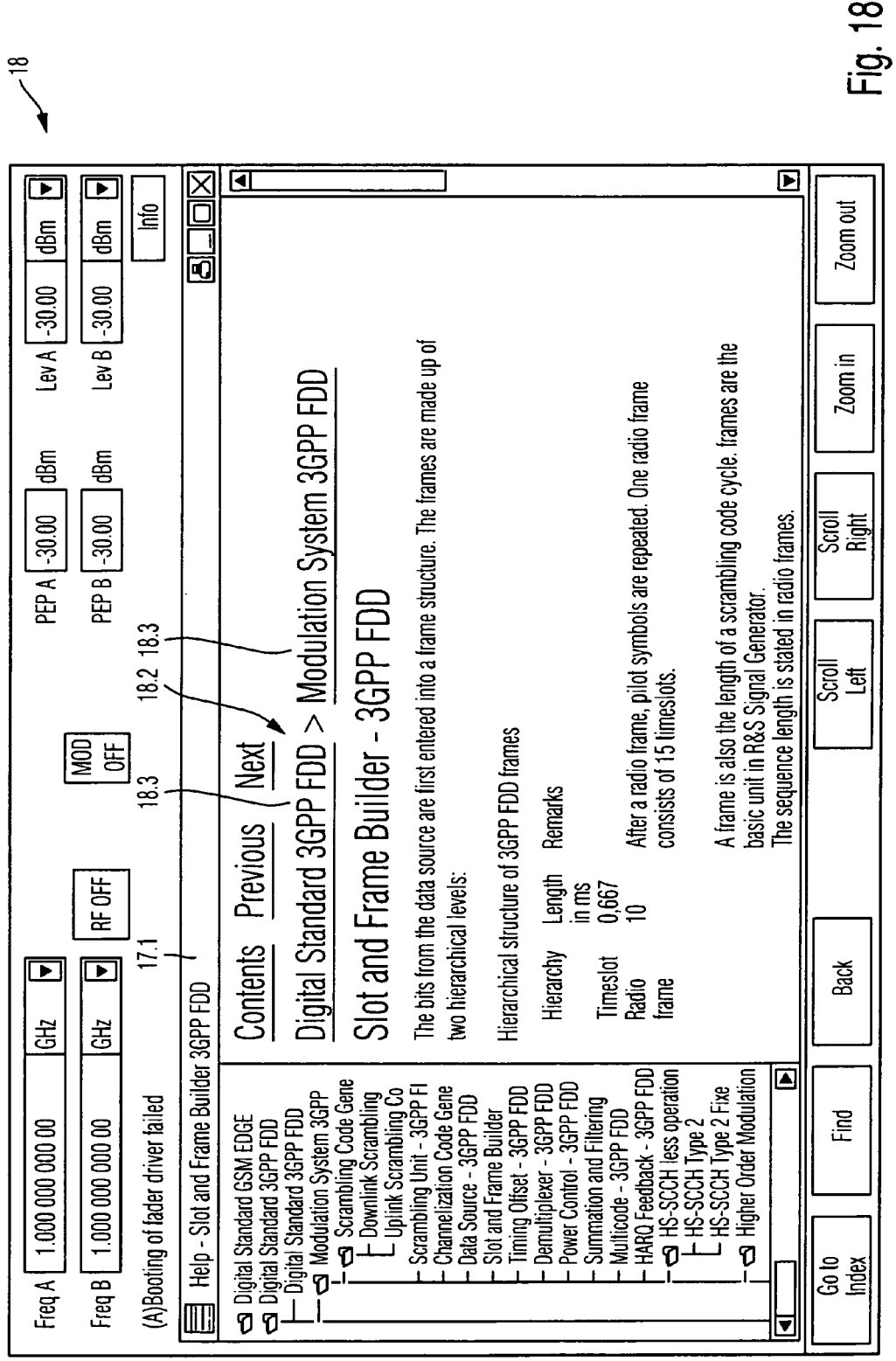
FIG. 18 shows a sixteenth screen display.

FIG. 18 shows a sixteenth screen display 18 with the fifth window 17.1, with the enlarged second region 18.2 (originating from 17.2) and with the enlarged links 18.3 (originating from 17.3).

It is evident that a non-visually demarcated display region has been enlarged here. In this case, the logical connection between the displayed pure text information and the executable links provides a sufficiently clear spatial separation.

The enlarged display is preferably retained for the duration of the touch plus a given delay time. As a result of the delay time, the enlarged display is also retained if the user briefly removes her finger, for example, between the first touching of the virtual operating element (with subsequent enlargement) and the selection of a given position on the enlarged operating element. Dependent upon the embodiment of the touchscreen evaluation, this brief removal of the finger may even be necessary. The user can activate, that is to say, for example, press or draw (for example, in the case of a scrollbar (scrollbar)) the required operating element in the enlarged display, and the corresponding function is triggered, or the display is further enlarged by touching a defined sub-region. The delay time is advantageously restarted with each operating action within the enlarged display region.

In the case of the movement of a finger over the display, the enlarged region is not moved. After the display of the enlarged operating element has been implemented, a movement of the finger is used for navigation or operation within the enlarged operating element. The position of the enlarged operating element itself is not changed as a result. On the contrary, it is specified as a sub-region for every enlargeable display region through the definition of the parameters for the type of enlargement.

Furthermore, the invention allows alternative operation with keys, rotary knob, joystick, mouse etc. without any restrictions. The enlargement of operating elements or information units described above is only triggered in one exemplary embodiment, if the operating element or the information unit is selected with the touchscreen, that is to say, as a virtual operating element, however, not if this is implemented with the mouse, keys or similar. Accordingly, the advantage of the operation with keys, rotary knob, joystick, mouse etc.—namely that the virtual operating elements can be displayed relatively small—is fully preserved.

The invention is not restricted to the exemplary embodiment presented. On the contrary, individual features of the exemplary embodiments can be advantageously combined with one another.

KEY TO DRAWINGS

FIG. 2

| | | |
|---|---|---|
| 2.1 | | Definition of at least 1 enlargeable display region ($\alpha$) 1 further enlargeable display region ($\beta$) |
| 2.2 | | Definition of at least 1 sensitive region (SB) |
| 2.3 | | Allocation of SB to ($\alpha$) or ($\beta$) |
| 2.4 | | Determination of a touchscreen signal (TSS) |
| 2.5 | | Allocation of TSS to ($\alpha$) or ($\beta$) |
| 2.6 | | Enlargement of ($\alpha$) or ($\beta$) to form enlarged ($\alpha$) or ($\beta$) = ($\alpha'$) or ($\beta'$) |
| 2.7 | | Opening of a scrollbar (BLL) |
| 2.8 | | Editing and/or use of ($\alpha'$) or ($\beta'$) |
| 2.9 | | Definition of ($\alpha'$) or ($\beta'$) as ($\alpha$)$_{(new)}$ or ($\beta$)$_{(new)}$ |
| 2.9 | | Or definition of $\gamma$ enlargeable sub-region in ($\alpha'$) or ($\beta'$) |
| 2.7.1 | | Definition of BLL as ($\alpha$)$_{(new')}$ |
| 2.10 | | End |

The invention claimed is:

1. A method for operating a measurement instrument including a touchscreen and an alternate operation device, the method comprising:
   enlarging at least one display region on a display device of the measurement instrument;
   defining at least two enlargeable display regions;
   distinguishing a touchscreen touch from an operation of the alternate operation device for selecting one of the at least two enlargeable display regions;
   evaluating the touchscreen touch to determine a touchscreen signal;
   assigning a touchscreen signal obtained in this manner to an enlargeable display region to be enlarged; and
   enlarging the enlargeable display region to be enlarged, wherein a type of enlargement is individually specified for each enlargeable display region;
   wherein the type of enlargement is determined a priori dependent upon size and/or shape and/or orientation and/or position of the enlargeable display region to be enlarged;
   wherein the type of enlargement includes a variation of geometric parameters of the enlargeable display region and a simultaneous variation of at least one of a font, a font size, a character spacing, and a line spacing of a text element of the enlargeable display region independently from one another, and independently from the variation of the geometric parameters of the enlargeable display region; and
   wherein enlarging of the enlargeable display region is only triggered if the enlargeable display region is selected via the touchscreen touch as a virtual operating element instead of via the alternate operation device.

2. The method according to claim 1, wherein, within an enlargeable and/or enlarged display region, an enlarged display region and/or a further enlargeable display region is defined as a partial enlargeable region of the enlargeable and/or enlarged display region.

3. The method according to claim 2, wherein the type of enlargement in each case of an enlargeable display region is specified by several independent parameters.

4. The method according to claim 2, wherein the type of enlargement is specified dependent upon the content of the enlargeable display region to be enlarged.

5. The method according to claim 2, wherein the display region to be displayed in an enlarged manner contains at least one operating element and/or information unit.

6. The method according to claim 2, wherein a scroll bar is defined as an enlargeable display region.

7. The method according to claim 2, wherein a scroll bar is automatically opened on the display in the case of an enlargement of an enlargeable display region or of a partial enlargeable region in which the entire display region is not displayed simultaneously in an enlarged manner, so that a content of the enlarged display region can be scrolled.

8. The method according to claim 2, wherein the type of enlargement can be influenced by at least one parameter which is adjustable.

9. The method according to claim 1, wherein the type of enlargement in each case of an enlargeable display region is specified by several independent parameters.

10. The method according to claim 9, wherein the type of enlargement is specified dependent upon the content of the enlargeable display region to be enlarged.

11. The method according to claim 9, wherein the display region to be displayed in an enlarged manner contains at least one operating element and/or information unit.

12. The method according to claim 9, wherein a scroll bar is defined as an enlargeable display region.

13. The method according to claim 9, wherein a scroll bar is automatically opened on the display in the case of an enlargement of an enlargeable display region or of a partial enlargeable region in which the entire display region is not displayed simultaneously in an enlarged manner, so that a content of the enlarged display region can be scrolled.

14. The method according to claim 9, wherein the enlargement is reversed after the expiry of a given time or after a touch on the touchscreen provided for this purpose.

15. The method according to claim 1, wherein the type of enlargement is specified dependent upon the content of the enlargeable display region to be enlarged.

16. The method according to claim 1, wherein the display region to be displayed in an enlarged manner contains at least one operating element and/or information unit.

17. The method according to claim 1, wherein a scroll bar is defined as an enlargeable display region.

18. The method according to claim 1, wherein a scroll bar is automatically opened on the display in the case of an enlargement of an enlargeable display region or of a partial enlargeable region in which the entire display region is not displayed simultaneously in an enlarged manner, so that a content of the enlarged display region can be scrolled.

19. The method according to claim 1, wherein the type of enlargement can be influenced by at least one parameter which is adjustable.

20. The method according to claim 1, wherein the enlargement is reversed after the expiry of a given time or after a touch on the touchscreen provided for this purpose.

\* \* \* \* \*